US011553392B2

(12) United States Patent
Hwang et al.

(10) Patent No.: US 11,553,392 B2
(45) Date of Patent: Jan. 10, 2023

(54) METHOD AND DEVICE FOR REPORTING RADIO LINK FAILURE IN MOBILE COMMUNICATION SYSTEM

(71) Applicant: Samsung Electronics Co., Ltd., Suwon-si (KR)

(72) Inventors: June Hwang, Suwon-si (KR); Seungri Jin, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 59 days.

(21) Appl. No.: 17/250,269

(22) PCT Filed: Jun. 24, 2019

(86) PCT No.: PCT/KR2019/007579
§ 371 (c)(1),
(2) Date: Dec. 22, 2020

(87) PCT Pub. No.: WO2019/245352
PCT Pub. Date: Dec. 26, 2019

(65) Prior Publication Data
US 2021/0266811 A1 Aug. 26, 2021

(30) Foreign Application Priority Data
Jun. 22, 2018 (KR) ........................ 10-2018-0072397

(51) Int. Cl.
*H04W 36/30* (2009.01)
*H04W 36/00* (2009.01)
*H04W 28/06* (2009.01)

(52) U.S. Cl.
CPC ......... *H04W 36/305* (2018.08); *H04W 28/06* (2013.01); *H04W 36/0058* (2018.08); *H04W 36/0061* (2013.01)

(58) Field of Classification Search
CPC ..... H04W 24/08; H04W 24/10; H04W 28/06; H04W 36/0055; H04W 36/0058;
(Continued)

(56) References Cited

U.S. PATENT DOCUMENTS 9,832,806 B2 11/2017 Lee et al.
10,045,384 B2 8/2018 Lee et al.
(Continued)

FOREIGN PATENT DOCUMENTS

KR 10-2014-0120807 A 10/2014
KR 10-2015-0020031 A 2/2015
(Continued)

OTHER PUBLICATIONS

International Search Report and Written Opinion of the International Searching Authority in connection with International Application No. PCT/KR2019/007579 dated Oct. 16, 2019, 7 pages.
(Continued)

*Primary Examiner* — Kan Yuen

(57) ABSTRACT

The disclosure relates to a method and apparatus for reporting a radio link failure (RLF) in a mobile communication system. According to an embodiment of the disclosure, a method, performed by a user equipment, of reporting an RLF includes detecting a first RLF during use of a first radio access technology (RAT), accessing a base station by using a second RAT different from the first RAT, and transmitting a report on the first RLF to the base station by using the second RAT.

14 Claims, 17 Drawing Sheets

(58) Field of Classification Search
CPC ......... H04W 36/0061; H04W 36/0066; H04W 36/00837; H04W 36/14; H04W 36/305; H04W 76/15; H04W 76/18; H04W 76/19; H04W 88/06
See application file for complete search history.

(56) References Cited

U.S. PATENT DOCUMENTS

| | | | | |
|---|---|---|---|---|
| 2013/0165108 A1* | 6/2013 | Xu | ......................... | H04W 24/00 455/423 |
| 2014/0112155 A1* | 4/2014 | Lindoff | ................. | H04W 24/08 370/242 |
| 2015/0036512 A1* | 2/2015 | Xu | ...................... | H04L 41/0631 370/242 |
| 2015/0312813 A1* | 10/2015 | Xu | .................. | H04W 36/00837 455/438 |
| 2019/0082363 A1* | 3/2019 | Park | ....................... | H04W 76/18 |
| 2019/0229980 A1* | 7/2019 | Han | ..................... | H04L 41/0668 |
| 2019/0364462 A1 | 11/2019 | Kim et al. | | |
| 2020/0084686 A1 | 3/2020 | Nigam et al. | | |
| 2020/0169925 A1* | 5/2020 | Li | ......................... | H04W 36/36 |

FOREIGN PATENT DOCUMENTS

| | | |
|---|---|---|
| KR | 10-2016-0045669 A | 4/2016 |
| KR | 10-2018-0093454 A | 8/2018 |

OTHER PUBLICATIONS

Ericsson, "SCell RLF discussion (TP to 38.331)," R2-1807037 (Revision of R2-1804793), 3GPP TSG-RAN WG2 Meeting #102, Busan, Korea, May 21-25, 2018, 6 pages.

Mediatek Inc., "Need of RLF Report in NR," R2-1807459 (revision of R2-1804612), 3GPP TSG-RAN WG2 Meeting #102, Busan, Korea, May 21-25, 2018, 3 pages.

Notice of Non-Final Rejection dated Jul. 4, 2019 in connection with Korean Patent Application No. 10-2018-0072397, 7 pages.

* cited by examiner

METHOD AND DEVICE FOR REPORTING RADIO LINK FAILURE IN MOBILE COMMUNICATION SYSTEM

CROSS-REFERENCE TO RELATED APPLICATIONS

This application is a 371 National Stage of International Application No. PCT/KR2019/007579, filed Jun. 24, 2019, which claims priority to Korean Patent Application No. 10-2018-0072397, filed Jun. 22, 2018, the disclosures of which are herein incorporated by reference in their entirety.

BACKGROUND

1. Field

The disclosure relates to a method and apparatus for reporting a radio link failure in a mobile communication system.

2. Description of Related Art

To meet the increasing demand with respect to wireless data traffic after the commercialization of $4^{th}$ generation (4G) communication systems, efforts have been made to develop $5^{th}$ generation (5G) or pre-5G communication systems. For this reason, 5G or pre-5G communication systems are called 'beyond 4G network' communication systems or 'post long-term evolution (post-LTE)' systems. A 5G communication system determined by the 3GPP is called a New Radio (NR) system. To achieve high data transfer rates, implementation of 5G communication systems in an ultra-high frequency (mmWave) band (e.g., a 60-GHz band) is being considered. To reduce path loss of radio waves and increase a transmission distance of radio waves in the ultra-high frequency band, for 5G communication systems, various technologies such as beamforming, massive multiple-input and multiple-output (massive MIMO), full-dimension MIMO (FD-MIMO), array antennas, analog beamforming, and large-scale antennas are being studied and applied to an NR system. To improve system networks, for 5G communication systems, various technologies such as evolved small cells, advanced small cells, cloud radio access networks (cloud-RAN), ultra-dense networks, device-to-device (D2D) communication, wireless backhaul, moving networks, cooperative communication, coordinated multi-points (CoMP), and reception interference cancellation have been developed. In addition, for 5G communication systems, advanced coding modulation (ACM) technologies, such as hybrid frequency-shift keying (FSK) and quadrature amplitude modulation (QAM) (FQAM) and sliding window superposition coding (SWSC), and advanced access technologies, such as filter bank multi-carrier (FBMC), non-orthogonal multiple access (NOMA), and sparse code multiple access (SCMA), have been developed.

The Internet has evolved from a human-based connection network whereby humans generate and consume information to the Internet-of-things (IoT) whereby distributed elements such as objects exchange information with each other to process the information. Internet-of-Everything (IoE) technology is also emerging, in which big data processing technology or the like is combined with IoT technology through a cloud server or the like. To implement the IoT, various technological elements such as sensing technology, wired/wireless communication and network infrastructures, service interface technology, and security technology are required. In recent years, technologies related to sensor networks for connecting objects, machine-to-machine (M2M) communication, and machine-type communication (MTC) have been studied. In an IoT environment, intelligent Internet technology (IT) services may be provided to collect and analyze data obtained from connected objects to generate new value in human life. As existing information technology (IT) and various industries converge and combine with each other, the IoT is applicable to various fields such as smart homes, smart buildings, smart cities, smart cars or connected cars, smart grids, health care, smart home appliances, and advanced medical services.

Various attempts are being made to apply 5G communication systems to the IoT network. For example, 5G communication such as sensor networks, M2M communication, MTC, or the like is implemented by technology such as beamforming, MIMO, array antennas, or the like. Application of the cloud RAN as the above-described big data processing technology may be an example of convergence of 5G communication technology and IoT technology.

As a variety of services can be provided owing to the development of mobile communication systems as described above, a method of effectively providing such services is required.

SUMMARY

According to an embodiment of the disclosure, a method, performed by a user equipment, of reporting a radio link failure (RLF) includes detecting a first RLF during use of a first radio access technology (RAT), accessing a base station by using a second RAT different from the first RAT, and transmitting a report on the first RLF to the base station by using the second RAT.

According to another embodiment of the disclosure, a user equipment includes a communicator; and a controller configured to control detecting of a RLF during use of a first RAT, access a base station by using a second RAT different from the first RAT, and transmit a report on the first RLF to the base station by using the second RAT.

According to embodiments of the disclosure set forth herein, services can be effectively provided in a mobile communication system.

DETAILED DESCRIPTION

Figure 1:
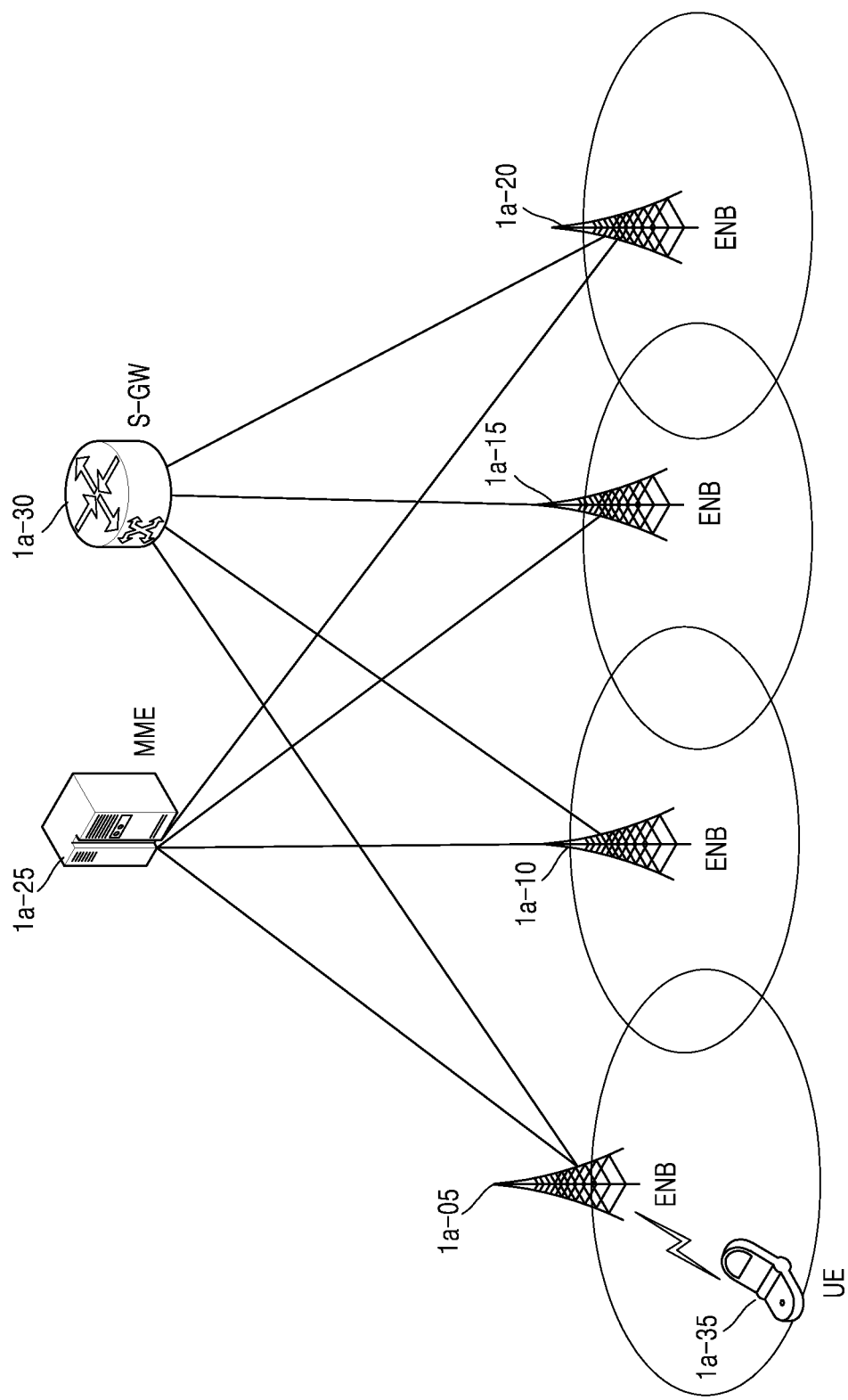
FIG. 1 is a diagram illustrating a configuration of a long-term evolution (LTE) system.

According to an embodiment of the disclosure, a method, performed by a user equipment, of reporting a radio link failure (RLF) includes detecting a first RLF during use of a first radio access technology (RAT), accessing a base station by using a second RAT different from the first RAT, and transmitting a report on the first RLF to the base station by using the second RAT.

In an embodiment of the disclosure, the report on the first RLF may include at least one of: a measured value related to a reference signal, a type of the reference signal, location information, cell identification information, or radio-frequency channel information.

In an embodiment of the disclosure, the transmitting of the report on the first RLF to the base station by using the second RAT may include transmitting information on whether there is a report on the first RLF to the base station.

In an embodiment of the disclosure, the transmitting of the information on whether there is a report about the first RLF to the base station may include transmitting a radio resource control (RRC) message including an indicator indicating whether there is a report about the first RLF to the base station.

In an embodiment of the disclosure, the transmitting of the report on the first RLF to the base station by using the second RAT may include before the accessing of the base station by using the second RAT, transmitting information on whether there is a report on a third RLF detected during use of a third RAT to the base station, and the transmitting of the information on whether there is a report about the first RLF to the base station may include transmitting an RRC message including an indicator indicating to report an RLF in each RAT to the base station.

In an embodiment of the disclosure, the transmitting of the report on the first RLF to the base station by using the second RAT may include receiving an instruction to transmit a report on an RLF from the base station and transmitting the report on the first RLF to the base station in response to the instruction to transmit a report on an RLF.

In an embodiment of the disclosure, the receiving of the instruction to transmit a report on an RLF from the base station may include receiving an RRC message including an indicator indicating to report the RLF.

In an embodiment of the disclosure, the receiving of the RRC message including the indicator indicating to report the RLF may include receiving an RRC message including an indicator indicating to report the RLF in each RAT.

In an embodiment of the disclosure, the transmitting of the report on the first RLF to the base station in response to the instruction to transmit a report on an RLF may include generating a report on an RLF in an RAT indicated in the instruction to transmit a report on an RLF or transmitting an already generated RLF report to the base station.

In an embodiment of the disclosure, the method may further include discarding the report on the first RLF a predetermined time after the transmitting of the report on the first RLF.

According to another embodiment of the disclosure, a user equipment includes: a communicator; and a controller configured to control to detect a RLF during use of a first RAT, access a base station by using a second RAT different from the first RAT, and transmit a report on the first RLF to the base station by using the second RAT.

In an embodiment of the disclosure, the report on the first RLF may include at least one of: a measured value related to a reference signal, a type of the reference signal, location information, cell identification information, or radio-frequency channel information.

In an embodiment of the disclosure, the controller may be further configured to control to transmit information on whether there is a report about the first RLF to the base station.

In an embodiment of the disclosure, the controller may be further configured to control: to receive an instruction to transmit a report on an RLF from the base station, and transmit the report on the first RLF to the base station in response to the instruction to transmit a report on an RLF.

In an embodiment of the disclosure, the controller may be further configured to control to discard the report on the first RLF a predetermined time after the transmitting of the report on the first RLF.

Hereinafter, embodiments of the disclosure will be described in detail with reference to the accompanying drawings.

When embodiments of the disclosure are described herein, a description of techniques which are well known in the technical field to which the disclosure pertains and are not directly related to the disclosure will be omitted. This is to more clearly convey the gist of the disclosure by omitting unnecessary description.

For the same reason, some components are exaggerated, omitted, or schematically illustrated in the accompanying drawings. The size of each component does not entirely reflect the actual size thereof. The same reference numerals are allocated to the same or corresponding elements in each drawing.

Advantages and features of the disclosure and methods of achieving them will be apparent from embodiments of the disclosure described in detail, in conjunction with the accompanying drawings. However, the disclosure is not limited to the embodiments thereof below and may be embodied in many different forms. Rather, these embodiments are provided so that this disclosure will be thorough and complete and will fully convey the concept of the disclosure to those of ordinary skill in the art. The disclosure should be defined by the scope of the claims. The same reference numerals refer to the same components throughout the specification.

In this case, it will be understood that each block of process flowcharts and combinations of the flowcharts may be performed by computer program instructions. The computer program instructions may be installed in a processor of a general-purpose computer, special-purpose computer, or other programmable data processing equipment, so that means to perform functions described in blocks of each flowchart may be produced by instructions executed by the processor of the computer or the other programmable data processing equipment. The computer program instructions may be stored in a computer usable or readable memory oriented to a computer or other programmable data processing equipment to implement functions in a particular way. Thus, an article of manufacture, including an instruction means for performing the function described in a block (or blocks) of each flowchart, may be produced by the instructions stored in the computer usable or readable memory. Because the computer program instructions may be stored in a computer or other programmable data processing equipment, the functions of the blocks of each flowchart may be provided by the instructions performing a series of operations in the computer or the other programmable data processing equipment to produce a process executable by the computer to generate a computer programmable instructions to operate the computer or the other data processing equipment.

In addition, each block may represent a module, segment, or part of code that includes one or more executable instructions for executing specified logical function(s). It should be noted that in some alternative embodiments, the functions described in the blocks may be performed in an order different from that described herein. For example, two blocks illustrated consecutively may be performed substantially simultaneously or performed in a reverse order according to functions corresponding thereto in some cases.

In this case, the term 'unit' used in embodiments set forth herein represents software or hardware components such as FPGA or ASIC, and a '~unit' performs certain roles. However, the term "unit" is not limited to software or hardware. The term "unit" may be configured to be stored in an addressable storage medium or to reproduce one or more processors. Thus, the term "unit" may include, for example, components, such as software components, object-oriented software components, class components, and task components, processes, functions, attributes, procedures, subroutines, segments of program code, drivers, firmware, microcode, a circuit, data, database, data structures, tables, arrays, and parameters. Components and functions provided in "units" may be combined to a smaller number of components and "units" or may be divided into sub-components and "sub-units". In addition, the components and "units" may be implemented to execute one or more CPUs in a device or a secure multimedia card. In an embodiment of the disclosure, a "unit" may include one or more processors.

As used herein, terms used to identify a connection node, terms referring to network entities, terms referring to messages, a term referring to interface between network entities, terms referring to various types of identification information, and the like are examples provided for convenience of explanation. Accordingly, the disclosure is not limited to terms described below and other terms indicating objects having equivalent technical meanings may be used.

For convenience of description, terms and names defined in the standards of 5G, NR, and LTE systems are used in the present disclosure. However, the disclosure is not limited by these terms and names and is equally applicable to systems conforming to other standards.

That is, embodiments of the disclosure will be described in detail mainly with respect to communication standards defined by the 3GPP. However, the main subject of the disclosure may be applied to other communication systems having a similar technical background, by making slight changes therein without departing from the scope of the disclosure, as judged by those of ordinary skill in the technical field of the disclosure.

A method of reporting a radio link failure (RLF) is applicable to next-generation communication systems (a 5G or NR system), as well as an LTE system. In the LTE system, a user equipment (UE) is allowed to report, in an LTE cell, an RLF occurring only when the UE is located in the LTE cell. However, in the 5G or NR system, a communication area may be more limited than in an existing LTE system and RLFs are likely to be frequently reported. In addition, a possibility of finding a 5G or NR cell may be low, and thus, when an RLF occurring in the 5G or NR cell is allowed to be reported only by the 5G or NR cell, the RLF may not be appropriately reported.

In the disclosure, a method of reporting a previous RLF when an RLF has occurred in a 5G or NR system and thereafter an LTD base station is accessed will be described.

FIG. 1 is a diagram illustrating a configuration of a long-term evolution (LTE) system.

As illustrated in FIG. 1, a radio access network of the LTE system includes a plurality of evolved Nodes B (hereinafter referred to as eNBs, Nodes B or base stations) 1a-05, 1a-10, 1a-15, and 1a-20, a Mobility Management Entity (MME) 1a-25, and a Serving-Gateway (S-GW) 1a-30. A user equipment (hereinafter referred to as a UE or a terminal) 1a-35 accesses an external network through the eNBs 1a-05, 1a-10, 1a-15, and 1a-20 and the S-GW 1a-30.

The evolved Nodes B (hereinafter referred to as eNBs, Nodes B or base stations) 1a-05, 1a-10, 1a-15, and 1a-20 are access nodes of a cellular network and provide wireless access to UEs accessing the network. That is, the eNBs 1a-05, 1a-10, 1a-15, and 1a-20 collect status information, such as a buffer state, an available transmission power state, and a channel state, of UEs and perform scheduling to support connection between UEs and a core network (CN) so as to service users' traffic. The MMF 1a-25 is an entity that performs various control functions as well as UE mobility management and is connected to a plurality of eNBs. The S-GW 1a-30 is a device that provides a data bearer. The MME 1a-25 and the S-GW 1a-30 may authenticate UEs accessing the network, perform bearer management, etc. and process packets received from or to be transmitted to the eNBs 1a-05, 1a-10, 1a-15 and 1a-20.

Figure 2:
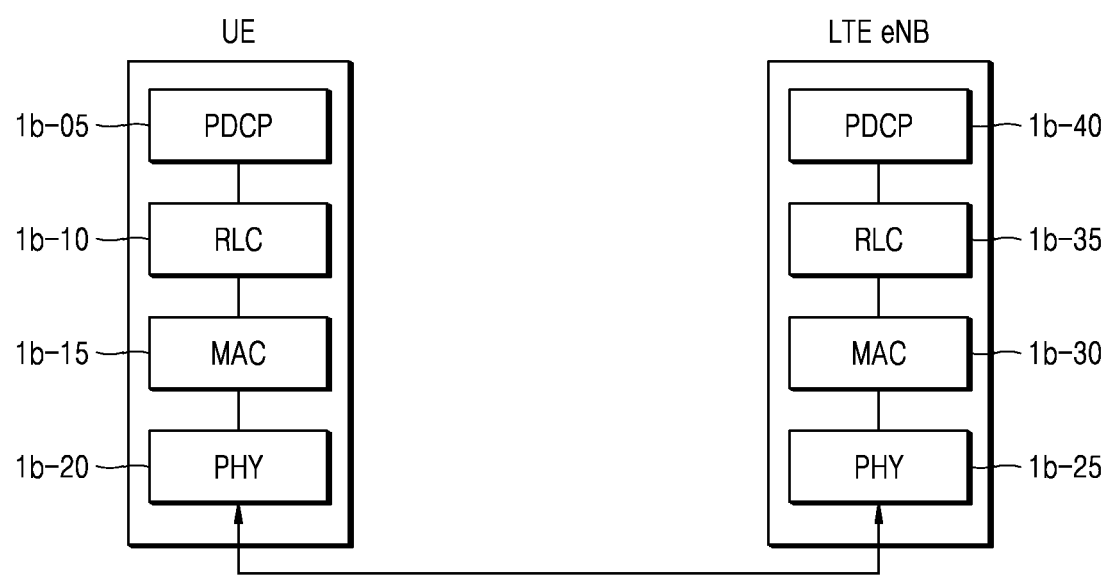
FIG. 2 is a diagram illustrating a radio protocol architecture in an LTE system.

FIG. 2 is a diagram illustrating a radio protocol architecture in an LTE system.

Referring to FIG. 2, the radio protocol architecture of the LTE system includes Packet Data Convergence Protocols (PDCPs) 1b-05 and 1b-40, Radio Link Controls (RLCs)

1b-10 and 1b-35, and Medium Access Controls (MACs) 1b-15 and 1b-30 of a UE and an eNB. The PDCPs 1b-05 and 1b-40 perform IP header compression/reconstruction and the like. Main functions of a PDCP may be summarized as follows:

- header compression and decompression: ROHC only;
- transfer of user data;
- in-sequence delivery of upper layer PDUs at PDCP re-establishment procedure for RLC AM;
- reordering (for split bearers in DC (only support for RLC AM): PDCP PDU routing for transmission and PDCP PDU reordering for reception);
- duplicate detection of lower layer SDUs at PDCP re-establishment procedure for RLC AM;
- retransmission of PDCP SDUs at handover and, for split bearers in DC, of PDCP PDUs at PDCP data-recovery procedure, for RLC AM;
- ciphering and deciphering; and
- timer-based SDU discarding in uplink.

The radio link controls (hereinafter referred to as RLCs) 1b-10 and 1b-35 reconstruct a PDCP packet data unit (PDU) in an appropriate size to perform an ARQ operation and the like. Main functions of an RLC may be summarized as follows:

- transfer of upper layer PDUs;
- ARQ function (error correction through ARQ (only for AM data transfer));
- concatenation, segmentation and reassembly of RLC SDUs (only for UM and AM data transfer);
- re-segmentation of RLC data PDUs (only for AM data transfer);
- reordering of RLC data PDUs (only for UM and AM data transfer);
- duplicate detection (only for UM and AM data transfer);
- protocol error detection (only for AM data transfer);
- RLC SDU discarding (only for UM and AM data transfer); and
- RLC re-establishment The MACs 1b-15 and 1b-30 are connected to several RLC layer devices configured in one UE, and multiplex RLC PDUs to MAC PDUs and demultiplex RLC PDUs from MAC PDUs. Main functions of a MAC may be summarized as follows:

- mapping between logical channels and transport channels;
- multiplexing/demultiplexing of MAC SDUs belonging to one or different logical channels into/from transport blocks (TB) delivered to/from the physical layer on transport channels;
- scheduling information reporting;
- HARQ function (error correction through HARQ);
- priority handling between logical channels of one UE;
- priority handling between UEs by means of dynamic scheduling;
- MBMS service identification;
- transport format selection; and
- padding.

Physical layers 1b-20 and 1b-25 channel-code and modulate higher-layer data into an OFDM symbol and transmit the OFDM symbol through a radio channel, or demodulate and channel-decode an OFDM symbol received through the radio channel and transmit resultant data to an upper layer.

Although not shown in FIG. 2, there are Radio Resource Control (RRC) layers above the PDCP layers 1b-05 and 1b-40 of the UE and the eNB, and configuration control messages related to accessing and measurement for radio resource control may be exchanged through the RRC layers.

Figure 3:
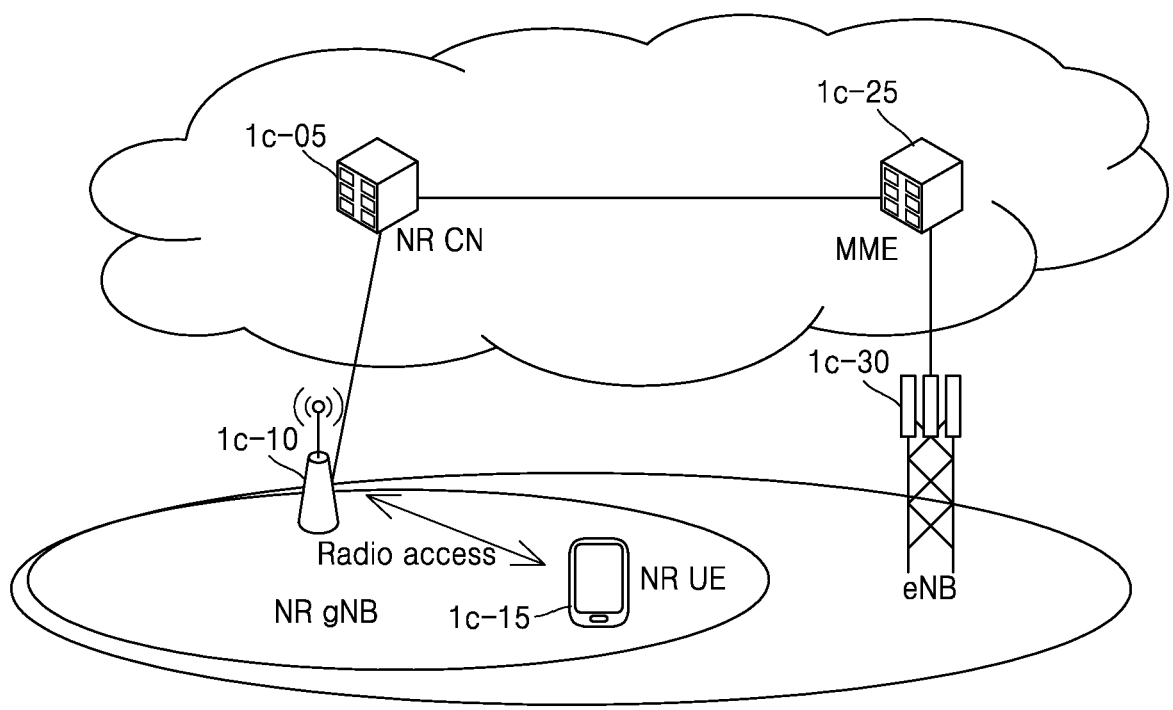
FIG. 3 is a diagram illustrating a configuration of a next-generation mobile communication system to which an embodiment of the disclosure is applied.

FIG. 3 is a diagram illustrating a configuration of a next-generation mobile communication system to which an embodiment of the disclosure is applied.

Referring to FIG. 3, a radio access network of a next-generation mobile communication system (NR or 5G system) includes a new radio node B (hereinafter referred to as an NR NB, an NR gNB or an NR base station) 1c-10 and a new radio core network (or next-generation core network (NG CN)) 1c-05. A new radio user equipment (hereinafter referred to as NR UE or UE) 1c-15 is connected to an external network through the NR gNB 1c-10 and the NR CN 1c-05.

In FIG. 3, the NR gNB 1c-10 corresponds to an Evolved Node B (eNB) of an LTE system. The NR gNB 1c-10 is connected to the NR UE 1c-15 through a wireless channel and may provide better services than an existing Node B. In the next-generation mobile communication system, because all user traffic is serviced through a shared channel, a device for scheduling by collecting status information, such as a buffer state, an available transmission power state, and a channel state, of UEs is needed and the NR gNB 1c-10 serves as the device. One NR gNB 1c-10 generally controls a plurality of cells, and includes a central unit (CU) in charge of control and signaling and a distributed unit (DU) in charge of transmission and reception of signals. The next-generation mobile communication system (5G or NR system) may have a maximum bandwidth equal to or greater than an existing maximum bandwidth to implement an ultra-high data transmission rate compared to an LTE system, and beamforming technology may be additionally applied thereto using orthogonal frequency division multiplexing (OFDM) as a wireless access technology. In addition, an adaptive modulation & coding (AMC) scheme may be applied to determine a modulation scheme and a channel coding rate according to a channel state of a UE. The NR CN 1c-05 performs functions such as mobility support, a bearer configuration, and a quality of service (QoS) configuration. The NR CN 1c-05 is a device that performs various control functions as well as UE mobility management and is connected to a plurality of gNBs. In addition, the next-generation mobile communication system (5G or NR system) may be connected with the LTE system, and the NR CN 1c-05 may be connected to the MME 1c-25 through a network interface. The MME 1c-25 is connected to an eNB 1c-30 which is an existing base station.

Figure 4:
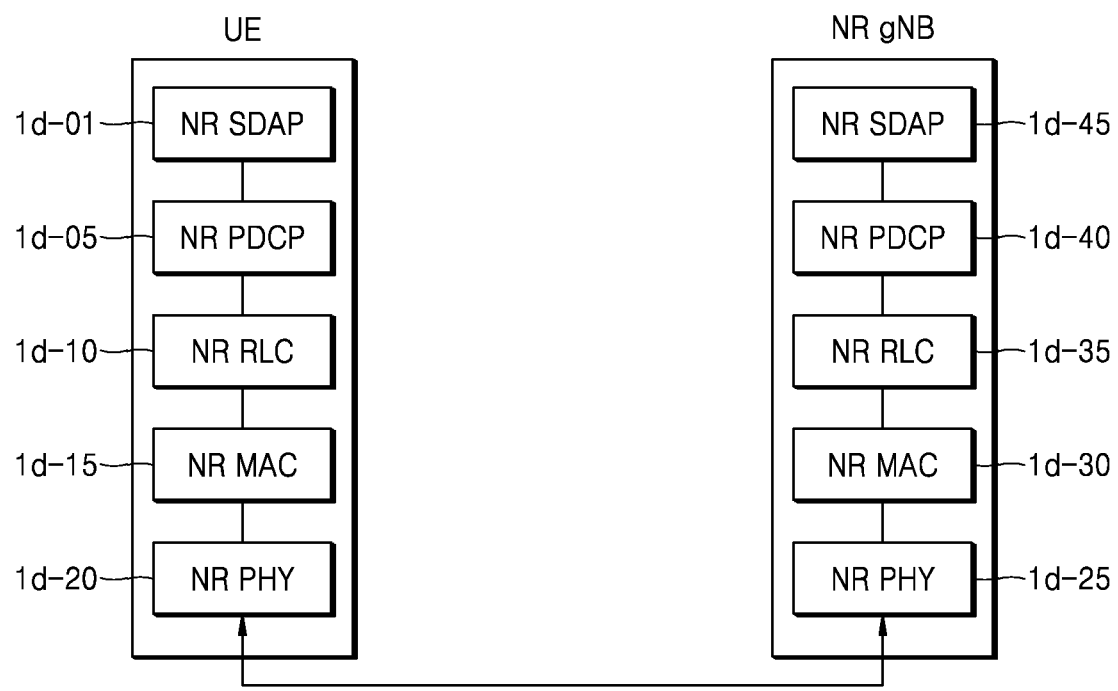
FIG. 4 is a diagram illustrating a radio protocol architecture of a next-generation mobile communication system to which an embodiment of the disclosure is applied.

FIG. 4 is a diagram illustrating a radio protocol architecture of a next-generation mobile communication system to which an embodiment of the disclosure is applied.

Referring to FIG. 4, the radio protocol architecture of the next-generation mobile communication system (5G or NR system) includes NR SDAPs 1d-01 and 1d-45, NR PDCPs 1d-05 and 1d-40, NR RLCs 1d-10 and 1d-35, and NR MACs 1d-15 and 1d-30 of an UE and an NR gNB.

Main functions of the NR SDAPs 1d-01 and 1d-45 may include some of the following functions:

- transfer of user plane data;
- mapping between a QoS flow and a data radio bearer (DRB) for both a downlink (DL) and an uplink (UL);
- marking QoS flow ID in both DL and UL packets; and
- mapping a reflective QoS flow to a DRB for UL SDAP PDUs.

With respect to an SDAP layer, the UE may receive an RRC message indicating a configuration with respect to whether to use a header of the SDAP layer or whether to use a function of the SDAP layer for each PDCP layer device, each bearer, or each logical channel. When an SDAP header is configured, an NAS reflective QoS configuration 1-bit indicator and an AS reflective QoS 1-bit indicator in the SDAP header may be used to indicate the UE to update or reconfigure information regarding mapping between QoS flows of an uplink and a downlink and a DRB. The SDAP header may include QoS flow ID information indicating QoS. QoS information may be used as data processing priority, scheduling information or the like to support smooth services.

Main functions of the NR PDCPs 1d-05 and 1d-40 may include some of the following functions:
  header compression and decompression: ROHC only;
  transfer of user data;
  in-sequence delivery of upper layer PDUs;
  out-of-sequence delivery of upper layer PDUs;
  PDCP PDU reordering for reception;
  duplicate detection of lower layer SDUs;
  retransmission of PDCP SDUs;
  ciphering and deciphering; and
  timer-based SDU discarding in uplink.

Here, a reordering function of an NR PDCP device refers to a function of reordering PDCP PDUs received from a lower layer in order according to a PDCP sequence number (SN), and may include a function of transmitting data to an upper layer in the reordering order or a function of directly transmitting the data to the upper layer regardless of the reordering order, a function of recording lost PDCP PDUs by reordering the PDCP PDUs, a function of reporting a state of the lost PDCP PDUs to a transmitting side, and a function of requesting retransmission of the lost PDCP PDUs.

Main functions of the NR RLCs 2d-10 and 2d-35 may include some of the following functions:
  transfer of upper layer PDUs;
  in-sequence delivery of upper layer PDUs;
  out-of-sequence delivery of upper layer PDUs;
  ARQ function (error correction through ARQ);
  concatenation, segmentation and reassembly of RLC SDUs;
  re-segmentation of RLC data PDUs;
  reordering of RLC data PDUs;
  duplicate detection;
  protocol error detection;
  RLC SDU discarding; and
  RLC re-establishment Here, the in-sequence delivery of the NR RLC device refers to a function of delivering RLC SDUs received from a lower layer to an upper layer in order. More specifically, the in-sequence delivery may include a function of reassembling RLC SDUs and transmitting a result of the reassembling when one RLC SDU is received by being divided into the several RLC SDUs, a function of rearranging received RLC PDUs according to an RLC sequence number (SN) or a PDCP SN, a function of recording lost RLC PDUs by reordering the RLC PDUs, a function of reporting a status of lost RLC PDUs to a transmitting side, a function of requesting retransmission of lost RLC PDUs, a function of delivering only RLC SDUs, in order, before lost RLC SDU to an upper layer when there are lost RLC SDUs, a function of delivering all RLC SDUs, which are received before the start of a timer, in order when the timer expires even when there are lost RLC SDUs, a function of delivering all RLC SDUs received so far to the upper layer when a timer expires even when there are lost RLC SDUs, and the like.

In this case, the RLC PDUs may be processed in the order in which they are received (in the order of arrival regardless of a serial number order or a sequence number order) and transmitted to a PDCP device in any order (out-of-sequence delivery). Segments stored in a buffer or to be received at a later time may be received and reconstructed into a complete RLC PDU, and the RLC PDU may be processed and transmitted to the PDCP device. An NR RLC layer may not include a concatenation function, and the concatenation function may be performed by an NR MAC layer or replaced by a multiplexing function of the NR MAC layer.

Here, the out-of-sequence delivery function of the NR RLC device refers to a function of directly transmitting RLC SDUs received from a lower layer to an upper layer in any order, and includes a function of reassembling and transmitting RLC SDUs when one RLC SDU is received by being divided into the RLC SDUs and a function of recording lost RLC PDUs by storing an RLC SN or PDCP SN of the received RLC PDUs and reordering the RLC PDUs.

The NR MACs 1d-15 and 1d-30 may be connected to several NR RLC layer devices of one UE, and main functions thereof may include some of the following functions:
  mapping between logical channels and transport channels;
  multiplexing/demultiplexing of MAC SDUs;
  scheduling information reporting;
  HARQ function (error correction through HARQ);
  priority handling between logical channels of one UE;
  priority handling between UEs by means of dynamic scheduling;
  MBMS service identification;
  transport format selection; and
  padding.

The NR PHY layers 1d-20 and 1d-25 channel-code and modulate higher-layer data into an OFDM symbol and transmit the OFDM symbol through a radio channel, and demodulate and channel-decode an OFDM symbol received through the radio channel and transmit resultant data to an upper layer.

Figure 5:
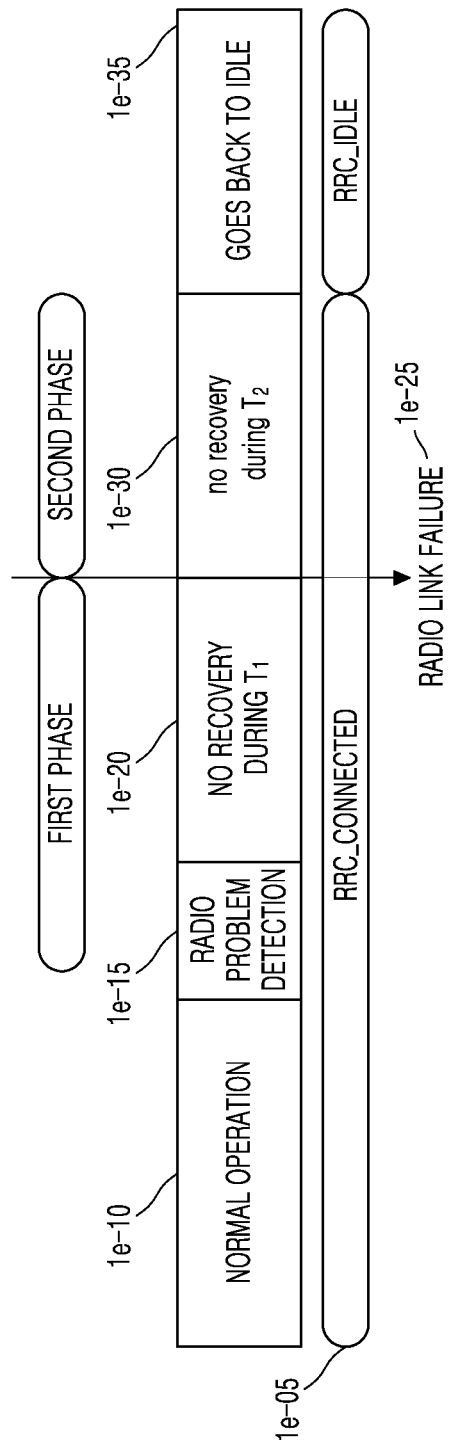
FIG. 5 is a diagram for explaining radio link monitoring and a radio link failure operation in an LTE system and a 5G or NR system.

FIG. 5 is a diagram for explaining radio link monitoring and a radio link failure operation in an LTE system and a 5G or NR system.

Referring to FIG. 5, radio link monitoring (RLM) and a radio link failure (RLF) operation which are performed by a UE in a primary cell (PCell) will be described. A RRC-connected UE RRC_CONNECTED 1e-05 may not receive good signal strength from a MeNB/MgNB during a normal operation with a PCell (1e-10). This situation may occur frequently when the UE 1e-05 moves quickly a serving cell to a target cell or when the quality of a radio link suddenly deteriorates. In this case, the UE 1e-05 receives, from a physical layer, a signal, e.g., an 'Out-Of-Sync' signal (OOS), indicating that services cannot be provided from the MeNB/MgNB (1e-15). When this signal is received N310 times, the UE1e-05 identifies a problem in wireless connection with the MeNB/MgNB and operates a T310 timer (1e-20). During the operation of the T310 timer, the UE 1e-05 does not perform a radio link recovery operation. In addition, before the T310 timer expires, the t310 timer is stopped when an 'in-sync' indicator is received the number of N311 times from the physical layer or when an RRC reconfiguration message indicating re-establishment is received. When the T310 timer expires, the UE 1e-05 declares a Radio Link Failure (RLF) (1e-25) and performs an RRC connection re-establishment process. In the RRC connection re-establishment process, the UE 1e-05 performs cell selection, MAC resetting, and suspending a Radio Bearer (RB). When the RRC connection re-establishment process starts, the UE 1e-05 operates the T311 timer and does not perform the radio link recovery operation during the operation of the T311 timer (1e-30). When RRC connection re-establishment is not performed during the operation of the T311 timer and the T311 timer expires, the UE 1*e*-05 transitions to an RRC idle state RRC IDLE (1*e*-35).

As described above, an RLF process in the LTE system is changelessly applicable to the 5G or NR system. In the LTE system, a physical layer of a UE measures downlink signal strength, based on a cell-specific reference signal (CRS). Here, the downlink signal strength refers to Reference Signal Received Power (RSRP) or Reference Signal Received Quality (RSRQ). Thereafter, the measured downlink signal strength is compared with a certain threshold Qout. Here, the threshold Qout may be a signal strength value satisfying a certain block error rate (BLER) of a PDCCH. When the measured downlink signal strength is not higher than the threshold Qout, the physical layer of the UE transmits an 'out-of-sync' indicator to a high layer. The relationship between the threshold Qout and the BLER depends on the performance of the UE and thus may be derived according to implementation of the UE. The 5G or NR system is different from the LTE system in that signal strength of a serving cell is measured using a Synchronization Signal Block (SSB) and a Channel State Information Reference Signal (CSI-RS). In the 5G or NR system, the RLF operation is performed independently in each of a Master Cell Group (MCG) and a Secondary Cell Group (SCG), and when an RLF occurs in the SCG, a message reporting the RLF is transmitted to the MCG and RRC connection re-establishment is not performed.

In the disclosure, a method of efficiently reporting an RLF in a 5G or NR system unlike in an LTE system will be described. In the LTE system, when an RLF occurs in a corresponding serving cell and is reported, a previous RLF situation is also reported according to a request from a base station when an LTE cell is accessed. However, service coverage in the 5G or NR system may be narrower than that in the LTE system and thus RLFs are likely to be reported frequently. In addition, there may be relatively few cases in which an RLF is reported after a 5G or NR serving cell is found and connected to. For example, there may be case in which an LTE-NR dual connectivity (EN-DC) UE accesses an LTE cell after an RLF has occurred in a 5G or NR cell. In this case, because the RLF occurring in the 5G or NR cell cannot be reported, a method of solving this problem is required. In an embodiment of the disclosure, an RLF occurring in an NR cell may be reported in an LTE cell, and the opposite case (i.e., an RLF occurring in the LTE cell may be reported in the NR cell) is possible.

Figure 6:
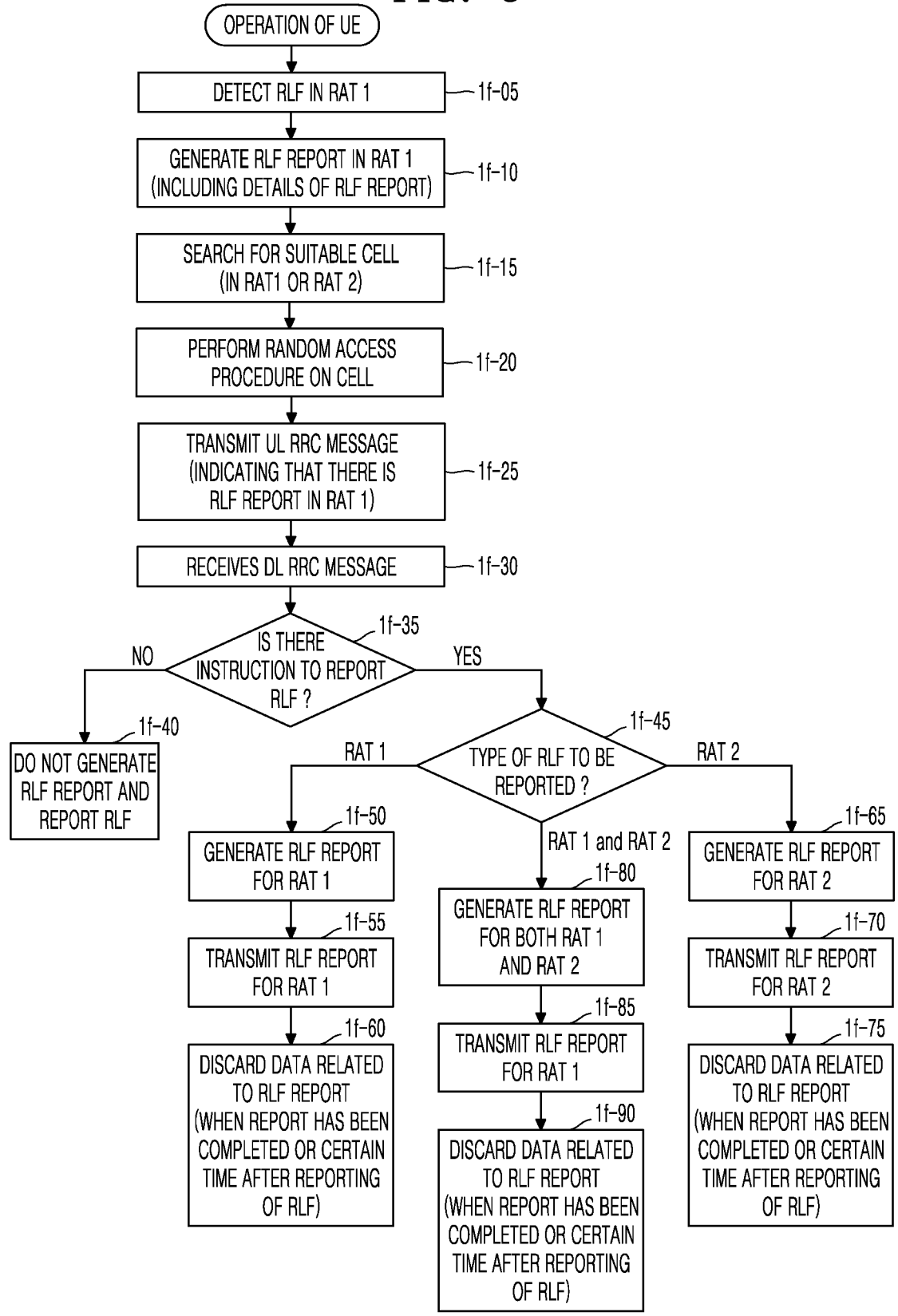
FIG. 6 is a diagram illustrating an operation of a user equipment to report a radio link failure (RLF), according to an embodiment of the disclosure.

FIG. 6 is a diagram illustrating an operation of a UE to report a radio link failure (RLF) according to an embodiment of the disclosure.

An operation of the UE to report an RLF when the RLF occurs in a 5G or NR cell and thereafter an LTE cell is connected to will be described with reference to FIG. 6. The operation of the UE illustrated in FIG. 6 is applicable to not only a case in which an RLF in the NR cell is reported after the LTE cell is connected to as described above but also the opposite case (i.e., when an RLF in the LTE cell is reported in the NR cell).

In operation 1*f*-05, in Radio Access Technology (RAT) 1, the UE in a connected state may detect an RLF due to the occurrence of a certain situation. In this case, the RAT 1 may be 5G, NR, or LTE, and embodiments of the disclosure will be described below assuming that the RAT 1 is 5G or NR. The situation in which the RLF occurred will be described with reference to FIG. 5 below. For example, the situation in which the RLF occurred may include a case in which a physical channel deteriorates sharply and thus an OOS signal is transmitted a number of times greater than a set value, i.e., a case in which the physical channel has entered an area where communication is not established. In operation 1*f*-10, the UE generates an RLF report in the RAT 1 (NR). The RLF report in the RAT 1 may include the following information:

- a measured value of a reference signal: RSRP, RSRQ or a Received Signal Strength Indicator (RSSI);
- type of reference signal: CSI-RS or SS/PBCH; and
- RLF-report-related information included in the RLF report in LTE: locationInfo, failedPCellId, pci-arfcn, etc.

In an embodiment of the disclosure, it is possible to quickly recover from the RLF in a situation in which E-UTRA New Radio-Dual Connectivity (EN-DC), Carrier Aggregation-Dual Connectivity (CA-DC), etc. are applied, based on the above information.

In operation 1*f*-15, the UE searches for a suitable cell. In operation 1*f*-20, after a certain cell is found, the UE performs a random access procedure on the cell. In operation 1*f*-20, the UE may search for a cell in the RAT 1 (NR) or RAT 2 (LTE) and access the searched-for cell.

In operation 1*f*-25, the UE may transmit an uplink RRC message to perform a procedure for completing an RRC connection establishment with a corresponding serving cell. In the RRC message, the presence of information regarding a previous RLF report in the RAT 1 may be indicated. The RRC message may be an RRC connection (re)establishment complete message or an RRC connection setup complete message. Alternatively, unlike in an LTE system, the RRC message may include an indicator indicating whether there is an RLF report for each RAT. For example, parameters such as RLF-reportNR and RLF-reportLTE may be set and may be 1-bit parameters indicating whether there is an RLF report in a corresponding RAT. In addition, such parameters may independently indicate whether there is an RLF report in corresponding RATs and both of them may be set to 1. That is, it is possible to indicate that there are RLF reports in all the RATs.

In operation 1*f*-30, the UE receives a downlink RRC message from a base station. The RRC message may include an indicator indicating the UE of perform the RLF. The base station may receive the uplink RRC message transmitted from the UE in operation 1*f*-25 to determine whether there is an RLF to be reported by the UE, and may actually indicate to report the RLF when necessary. In operation 1*f*-30, the base station may indicate the UE to report an RLF in each RAT by independently setting an RLF parameter in each RAT, like parameters in operation 1*f*-25. For example, a 1-bit indicator indicating an NR RLF report and a 1-bit indicator indicating an LTE RLF report may be provided.

In operation 1*f*-35, the UE may determine whether an instruction to report the RLF is given from the base station. When the base station does not indicate to report the RLF, the UE proceeds to operation 1*f*-40 and does not generate an RLF report and report the RLF to the base station. When the base station requests to report the RLF in an RRC message, the UE proceeds to operation 1*f*-45, and identifies a type of the RLF to be reported and performs a process of reporting the RLF.

When the base station indicates to report an RLF in the RAT 1 (NR), the UE proceeds to operation 1*f*-50, and generates an RLF report for the RAT 1 or includes an already generated RLF report in an RRC message. Thereafter, in operation 1*f*-55, the UE transmits the RLF report in an uplink RRC message to the base station. In detail, the RLF report may include the values described above in operation 1*f*-10, but is not limited thereto and may additionally include various other values. In operation 1*f*-60, the UE may discard data related to the RLF report immediately after the UE reports the RLF to the base station or a certain time after the reporting of the RLF. For example, the data related to the RLF report may be discarded in n hours (e.g., 48 hours) after the reporting of the RLF is performed by the UE.

In operation 1*f*-65, when in operation 1*f*-45, the type of the RLF to be reported is identified is RAT 2 (LTE), the UE generates an RLF report for RAT 2 or includes an already generated RLF report in an RRC message. Thereafter, in operation 1*f*-70, the UE transmits the RLF report in an uplink RRC message to the base station. In detail, the RLF report may include the values described above in operation 1*f*-10, but is not limited thereto and may additionally include various other values. In operation 1*f*-75, the UE may discard the data related to the RLF report immediately after the UE reports the RLF to the base station or a certain time after the reporting of the RLF. For example, the data related to the RLF report may be discarded in n hours (e.g., 48 hours) after the reporting of the RLF is performed by the UE.

In operation 1*f*-80, when in operation 1*f*-45, the type of the RLF to be reported is identified as both RAT 1 (NR) and RAT 2 (LTE), the UE generates an RLF report for both RAT 1 and RAT 2 or includes already generated RLF reports in an RRC message. Thereafter, in operation 1*f*-85, the UE transmits the RLF report in an uplink RRC message to the base station. In detail, the RLF report may include the values described above in operation 1*f*-10, but is not limited thereto and may additionally include various other values. In operation 1*f*-90, the UE may discard data related to the RLF report immediately after the UE reports the RLF to the base station or a certain time after the reporting of the RLF. For example, the data related to the RLF report may be discarded in n hours (e.g., 48 hours) after the reporting of the RLF is performed by the UE.

Figure 7:
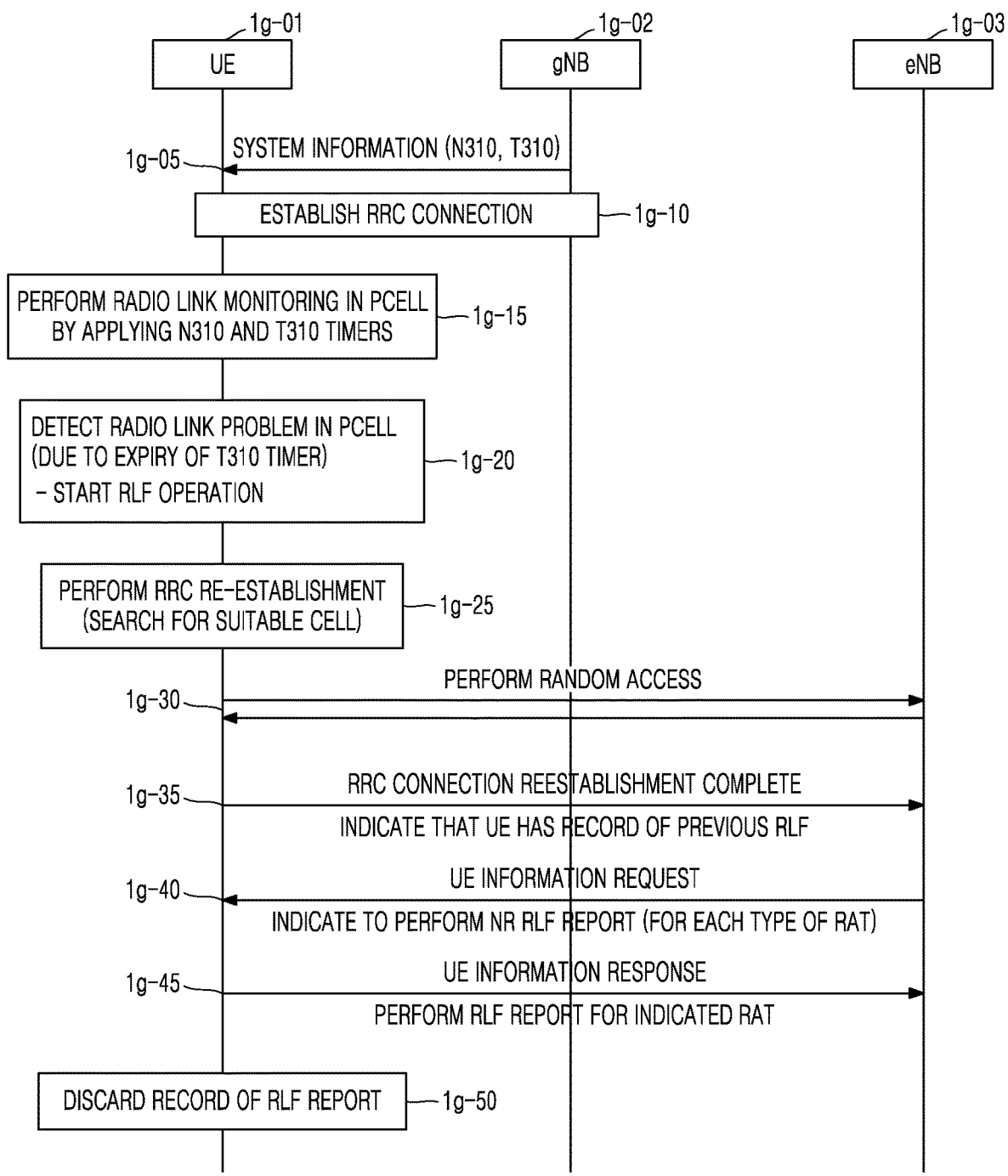
FIG. 7 is a diagram illustrating an operation of a mobile communication system to report an RLF, according to an embodiment of the disclosure.

FIG. 7 is a diagram illustrating an operation of a mobile communication system to report an RLF, according to an embodiment of the disclosure.

FIG. 7 illustrates operations of a UE 1*g*-01, a gNB 1*g*-02, and an eNB 1*g*-03 to perform a process of reporting an RLF, which occurs in an LTE cell, in an NR system.

After receiving system information from the gNB 1*g*-02 (1*g*-05), the UE 1*g*-01 establishes RRC connection with the gNB 1*g*-02 (1*g*-10). In this case, the system information may include time information corresponding to timers N310 and T310 in a corresponding cell. The corresponding cell may be one of a 5G or NR cell and an LTE cell and will be described below as an NR cell.

The UE 1*g*-01 performs radio link monitoring in a PCell by applying the N310 and T310 timers (1*g*-15). The UE 1*g*-01 detects a radio link problem due to the expiry of the T310 timer in the PCell (1*g*-20). When an RLF occurs in the PCell, RRC connection re-establishment is initiated as described above with reference to FIG. 5. The RRC connection re-establishment refers to an operation of resetting MAC, suspending Signaling Radio Bearers (SRBs) 1 and 2 and all Data Radio Bearers (DRBs), and releasing MCG SCells.

In operation 1*g*-25, after the RLF is declared, the UE 1*g*-01 searches for a suitable cell for radio link recovery, and when a suitable cell is found, re-establishment is performed on this cell. In this case, the suitable cell may be an LTE cell or a 5G or NR cell. In operation 1*g*-30, random access is performed on this cell to perform a connection process. In operation 1*g*-35, in order to complete the re-establishment of this cell, the UE 1*g*-01 may transmit an indicator, which indicates that the UE 1*g*-01 has a record of a previous RLF, in an RRC connection (re-)establishment complete message to the eNB 1*g*-03. Alternatively, the UE 1*g*-01 may transmit, to the eNB 1*g*-03, the indicator, which indicates that the UE 1*g*-01 has the record of the previous RLF, in a separate RRC message (e.g., an RLF report message) for reporting the RLF. In this case, as described above with reference to FIG. 6, the indicator may be configured as an independent parameter for each RAT type, and an RLF occurring in a 5G or NR cell may be reported to an LTE cell. In operation 1*g*-35, the eNB 1*g*-03 may instruct, through an RRC message, the UE to actually perform an RLF report, in consideration of whether there is the previous RLF reported by the UE 1*g*-01. As described above, the eNB 1*g*-03 may separately indicate a corresponding indicator for each RAT type as described above with reference to FIG. 6. In operation 1*g*-40, the UE 1*g*-01 may transmit the RLF report for RAT in an RRC message to the eNB 1*g*-03. The RRC messages used in operations 1*g*-35 and 1*g*-40 may be respectively a UE information request message and a UE information response message or may be new RRC messages.

In operation 1*g*-50, the UE 1*g*-10 may discard a record of the RLF report. The discarding of the record of the RLF record may be performed immediately after the UE 1*g*-01 reports an RLF to the eNB 1*g*-03 or a certain time after the reporting of the RLF. For example, the data related to the RLF report may be discarded in n hours (e.g., 48 hours) after the reporting of the RLF is performed by the UE 1*g*-01.

Figure 8:
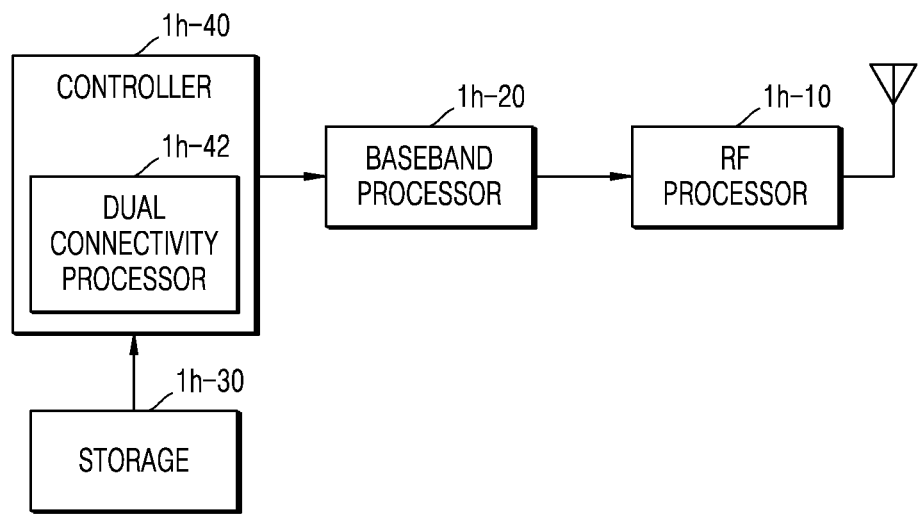
FIG. 8 is a block diagram illustrating a configuration of a user equipment according to an embodiment of the disclosure.

FIG. 8 is a block diagram illustrating a configuration of a UE according to an embodiment of the disclosure.

Referring to FIG. 8, the UE includes a radio-frequency (RF) processor 1*h*-10, a baseband processor 1*h*-20, a storage 1*h*-30, and a controller 1*h*-40.

The RF processor 1*h*-10 performs functions, such as signal-band conversion and amplification, to transmit and receive signals through a wireless channel. That is, the RF processor 1*h*-10 up-converts a baseband signal provided from the baseband processor 1*h*-20 into an RF band signal, transmits the RF band signal via an antenna, and down-converts an RF band signal received via the antenna into a baseband signal. For example, the RF processor 1*h*-10 may include a transmission filter, a reception filter, an amplifier, a mixer, an oscillator, a digital-to-analog convertor (DAC), an analog-to-digital convertor (ADC), and the like. Although only one antenna is shown in FIG. 8, the UE may include a plurality of antennas. The RF processor 1*h*-10 may include a plurality of RF chains. Furthermore, the RF processor 1*h*-10 may perform beamforming. For beamforming, the RF processor 1*h*-10 may adjust a phase and magnitude of each of signals transmitted and received through the plurality of antennas or antenna elements. In addition, the RF processor 1*h*-10 may perform MIMO and receive multiple layers when MIMO is performed.

The baseband processor 1*h*-20 performs conversion between a baseband signal and a bits string according to a physical layer standard of the system. For example, for data transmission, the baseband processor 1*h*-20 generates complex symbols by encoding and modulating a transmission bit string. For data reception, the baseband processor 1*h*-20 reconstructs a received bit string through demodulation and decoding of a baseband signal provided from the RF processor 1*h*-10. For example, when an orthogonal frequency division multiplexing (OFDM) scheme is used, for data transmission, the baseband processor 1*h*-20 generates complex symbols by encoding and modulating a transmission bit string, maps the complex symbols to subcarriers, and constructs OFDM symbols through inverse fast Fourier transform (IFFT) and cyclic prefix (CP) insertion. For data reception, the baseband processor 1h-20 divides a baseband signal from the RF processor 1h-10 into OFDM symbols, reconstructs signals mapped to subcarriers through fast Fourier transform (FFT), and reconstructs a received bit string by demodulation and decoding.

The baseband processor 1h-20 and the RF processor 1h-10 transmit and receive signals as described above. Accordingly, the baseband processor 1h-20 and the RF processor 1h-10 may be each referred to as a transmitter, a receiver, a transceiver, or a communicator. Furthermore, at least one of the baseband processor 1h-20 or the RF processor 1h-10 may include a plurality of communication modules to support different radio access technologies. In addition, at least one of the baseband processor 1h-20 or the RF processor 1h-10 may include different communication modules to process signals of different frequency bands. For example, the different radio access technologies may include a wireless LAN (e.g., IEEE 802.11), a cellular network (e.g., LTE), and the like. In addition, the different frequency bands may include a super-high-frequency (SHF) band (e.g., 2.NRHz or NRhz) and a millimeter wave band (e.g., 60 GHz).

The storage 1h-30 stores data such as a basic program, an application program, and configuration information for operation of the UE. In addition, the storage 1h-30 provides the stored data in response to a request from the controller 1h-40.

The controller 1h-40 controls overall operations of the UE. For example, the controller 1h-40 transmits and receives signals through the baseband processor 1h-20 and the RF processor 1h-10. Furthermore, the controller 1h-40 writes data to and reads data from the storage 1h-40. To this end, the controller 1h-40 may include at least one processor. For example, the controller 1h-40 may include a communication processor (CP) for control of communication and an application processor (AP) for control of an upper layer such as an application program.

Figure 9:
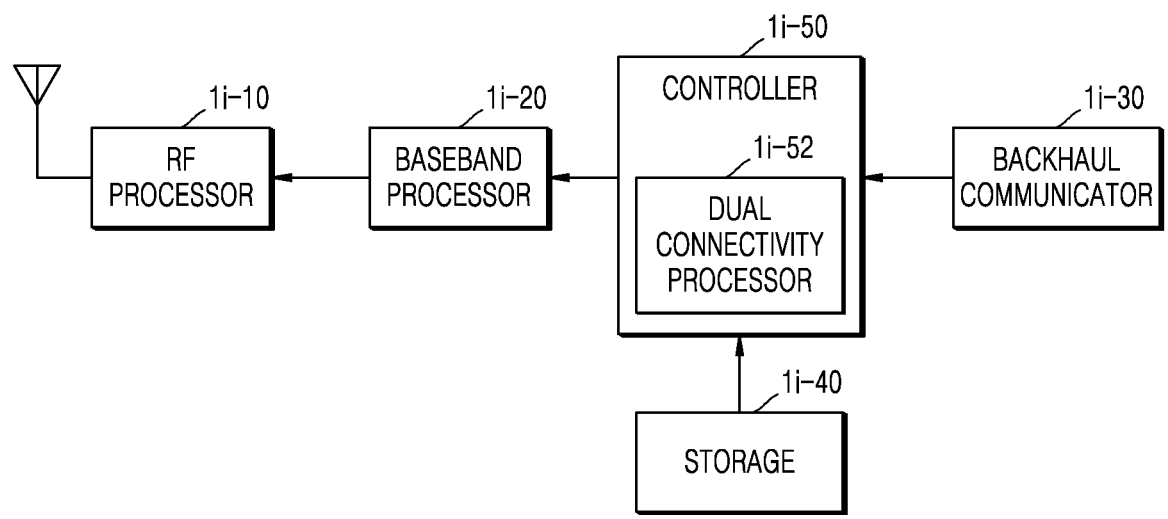
FIG. 9 is a block diagram illustrating a configuration of abase station according to an embodiment of the disclosure.

FIG. 9 is a block diagram illustrating a configuration of a gNB according to an embodiment of the disclosure.

As illustrated in FIG. 9, the gNB includes an RF processor 1i-10, a baseband processor 1i-20, a backhaul communicator 1i-30, a storage 1i-40, and a controller 1i-50.

The RF processor 1i-10 performs functions, such as signal-band conversion and amplification, to transmit and receive signals through a radio channel. That is, the RF processor 1i-10 up-converts a baseband signal provided from the baseband processor 1i-20 into an RF band signal and transmits the RF band signal via an antenna, and down-converts an RF band signal received via the antenna into a baseband signal. For example, the RF processor 1i-10 may include a transmission filter, a reception filter, an amplifier, a mixer, an oscillator, a DAC, an ADC, and the like. Although only one antenna is illustrated in FIG. 9, embodiments of the disclosure are not limited thereto and a plurality of antennas may be provided. The RF processor 1i-10 may include a plurality of RF chains. Furthermore, the RF processor 1i-10 may perform beamforming. For beamforming, the RF processor 1i-10 may adjust a phase and magnitude of each of signals transmitted and received through the plurality of antennas or antenna elements. The RF processor 1i-10 may perform a downlink MIMO operation by transmitting one or more layers.

The baseband processor 1i-20 performs conversion between a baseband signal and a bits string according to a physical layer standard. For example, for data transmission, the baseband processor 1i-20 generates complex symbols by encoding and modulating a transmission bit string. For data reception, the baseband processor 1i-20 reconstructs a received bit string through demodulation and decoding of a baseband signal provided from the RF processor 1i-10. For example, when the OFDM scheme is used, for data transmission, the baseband processor 1i-20 generates complex symbols by encoding and modulating a transmission bit string, maps the complex symbols to subcarriers, and then constructs OFDM symbols through IFFT and CP insertion. In addition, for data reception, the baseband processor 1i-20 divides a baseband signal from the RF processor 1i-10 into OFDM symbols, reconstructs signals mapped to subcarriers through FFT, and reconstructs a received bit string by demodulation and decoding. The baseband processor 1i-20 and the RF processor 1i-10 transmit and receive signals as described above. Accordingly, the baseband processor 1i-20 and the RF processor 1i-10 may be each referred to as a transmitter, a receiver, a transceiver, a communicator, or a wireless communicator.

The backhaul communicator 1i-30 provides an interface for communication with other nodes in a network. That is, the backhaul communicator 1i-30 converts a bit string transmitted from a main gNB to another node, e.g., an auxiliary gNB or a core network, into a physical signal, and converts a physical signal received from another node into a bit string.

The storage 1i-40 stores data, such as a basic program, an application program, and configuration information, for operation of the main gNB. In particular, the storage 1i-40 may store information about a bearer allocated to a connected UE, measurement results reported from the connected UE, and the like. The storage 1i-40 may further store information serving as a criterion for determining whether to provide multi-connection to the UE or stop the multi-connection. In addition, the storage 1i-40 provides the stored data in response to a request from the controller 1i-50.

The controller 1i-50 controls overall operations of the main gNB. For example, the controller 1i-50 transmits and receives signals through the baseband processor 1i-20 and the RF processor 1i-10 or through the backhaul communicator 1i-30. In addition, the controller 1i-50 writes data to and reads data from the storage 1i-40. To this end, the controller 1i-50 may include at least one processor.

In an embodiment of the disclosure, a radio link failure occurring in a next-generation mobile communication system may be reported not only when a 5G or NR cell is accessed but also when an LTE cell is accessed, so that a radio link failure occurring in a 5G or NR cell may be reported to a gNB at an appropriate point of time. The gNB may support UE mobility more effectively, based on the reported radio link failure.

Among methods for Ultra Reliable and Low Latency Communication (RLLC), there may be duplicate transmission. Generally, duplication is performed through a different component carrier (CC) (CC should hereinafter be understood to mean a CC including a sPcell) or a cell group (CG). When duplication is performed for each CC, problems at a radio link control (RLC) level may be reported to a gNB, so that when an error occurs in a link to be duplicated, scheduling and resource waste of the gNB and a UE may be quickly prevented.

For Scell failure discovery and reporting, there is only maximum RLC retransmission (reTX) in relation to carrier aggregation (CA) duplication. A UE in which such a problem is found transmits, to the gNB, identification (ID) information of a logical channel (LCH) connected to an RLC layer in which the problem has occurred. Upon receiving the ID information of the LCH, the gNB releases connection with a corresponding cell, which may be known implicitly, or releases connection of the RLC layer to the LCH ID, which may be known explicitly.

In the disclosure, a method of detecting a Scell failure due to malfunction at an RLC layer, and identifying the Scell failure through downlink radio link monitoring (RLM) and transmitting a result of the identification to a gNB will be described. Regarding the malfunction at the RLC layer, a problem of a corresponding Scell may be identified when uplink traffic occurs but cannot be identified when a channel between a gNB and a UE deteriorates without uplink traffic. When the UE identifies a channel failure through downlink Radio Link Monitoring (RLM)/Radio Link Failure (RLF), the UE may inform the gNB of ID of a cell, and the gNB may release the cell, release connection with the cell, which may be known explicitly, or release or reestablish L2 entity (i.e., a PDCP, an RLC layer or the like) associated with an LCH using the cell, which may be known explicitly, or releases the connection with the corresponding cell, which can be known implicitly.

Figure 10:
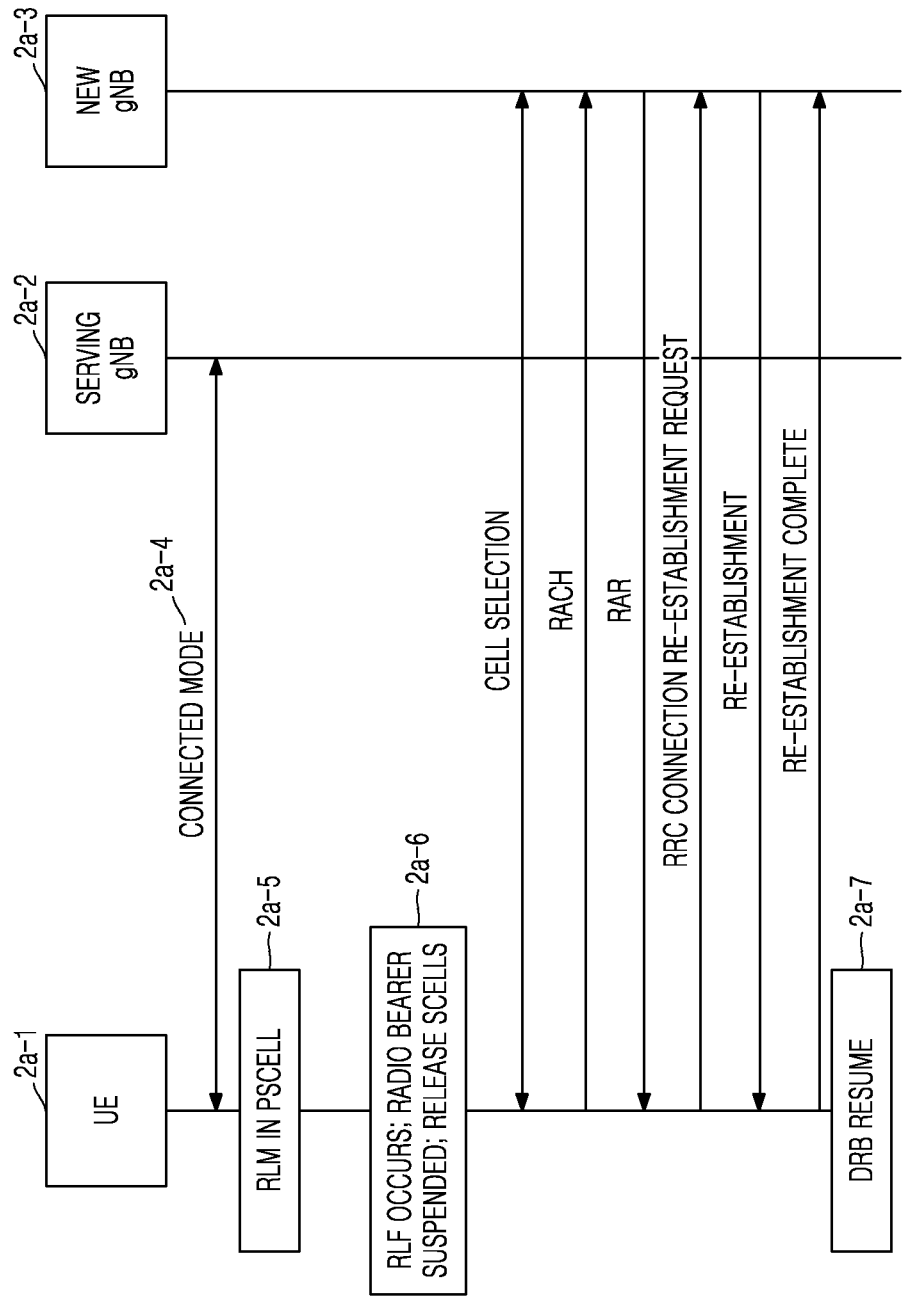
FIG. 10 is a diagram illustrating handling an RLF in a PCell in a mobile communication system.

FIG. 10 is a diagram illustrating handling an RLF in a Pcell in a mobile communication system.

Referring to FIG. 10, a UE, which is in a connected mode, performs radio link monitoring (RLM) only with respect to a sPcell. Thus, when an RLM failure (i.e., a physical-layer problem is found or an out-of-sync indication occurs during RLM in the same sense) and an RLF occur in the sPcell, a Pcell performs RRC re-establishment regardless of a state of a Scell and a Pscell transmits SCGFailureinformation.

FIG. 10 illustrates a method of handling an RLF when the RLF occurs in a sPcell. A UE 2*a*-1 is RRC-connected to a serving gNB 2*a*-2 (2*a*-4). At the same time, the UE 2*a*-1 performs RLM/RLF on a Pcell (2*a*-5). When an RLF occurs during the performing of the RLM/RLF, the UE 2*a*-1 suspends a radio bearer related to the Pcell and releases a Scell connected thereto (2*a*-6). Thereafter, the UE 2*a*-1 performs RRC connection re-establishment. More specifically, cell selection is performed, and when a new cell 2*a*-3 is found, RRC connection re-establishment is performed through a Random Access CHannel (RACH) operation with the new cell 2*a*-3. A Data Radio Bearer (DRB) with the Pcell is suspended during the performing of the RRC connection re-establishment, and the DRB is resumed, the DRB is resumed to transmit data to or receive data from the new cell 2*a*-3 after the RRC connection re-establishment is finished.

Figure 11:
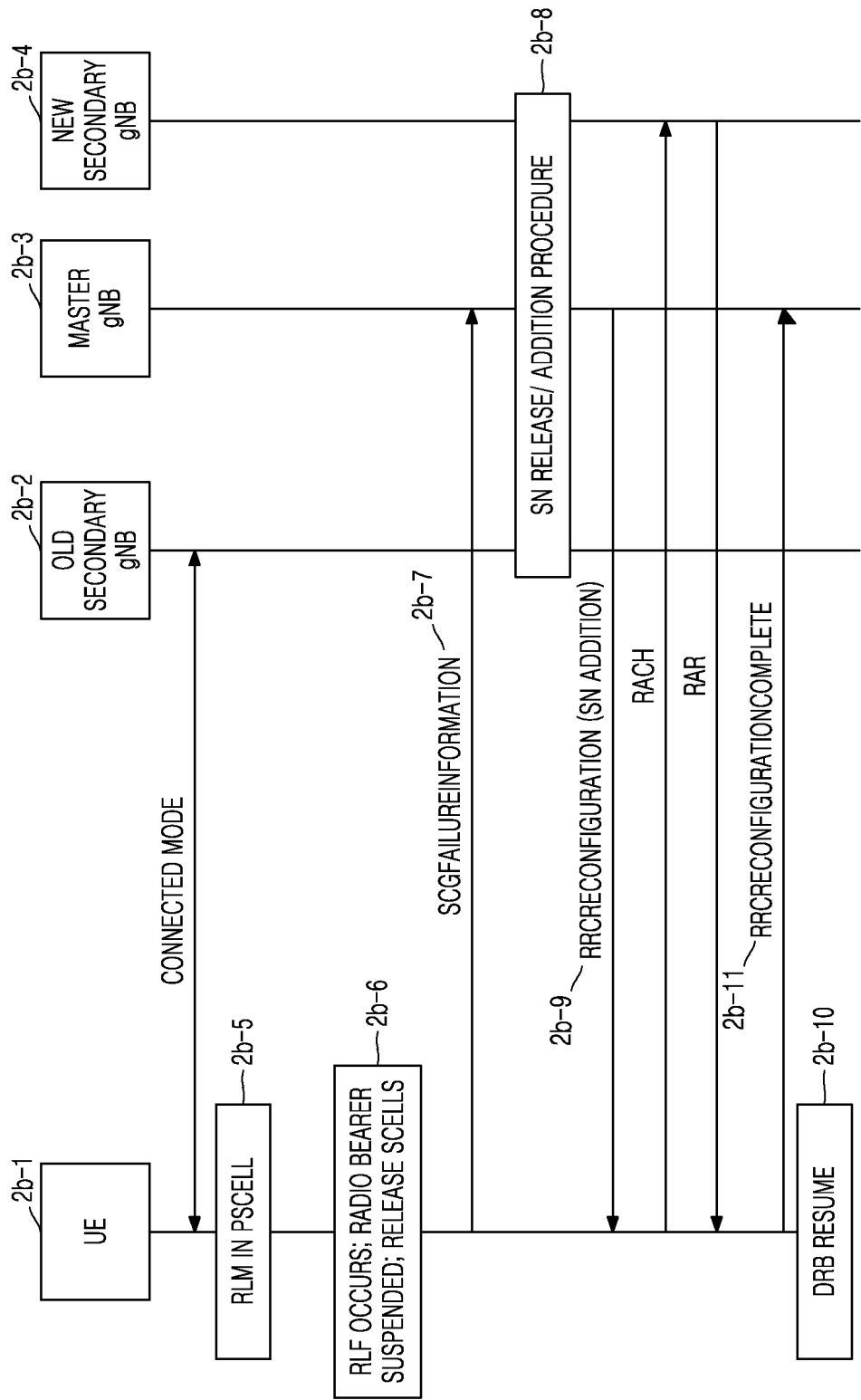
FIG. 11 is a diagram illustrating handling an RLF in a Pscell in a mobile communication system.

FIG. 11 is a diagram illustrating handling an RLF in a Pscell in a mobile communication system.

FIG. 11 illustrates handling an RLF in a Pscell. A UE 2*b*-1 is connected to an existing secondary gNB 2*b*-2 and performs RLM/RLF at the same time (2*b*-5). When the UE 2*b*-1 declares an RLF to the Pscell, a retained radio bearer is suspended and a Scell is released (2*b*-6). Next, SCGFailureInformation 2*b*-7 is transmitted to a master node (MN) 2*b*-3, so that the MN 2*b*-3 may release a current secondary node (SN) and add a new SN 2*b*-4 (2*b*-8). When receiving configuration information of the UE 2*b*-1 from the new SN 2*b*-4, the MN 2*b*-3 transmits the configuration information to the UE 2*b*-1 through RRC reconfiguration (2*b*-9). The UE 2*b*-1 receiving the configuration performs configuration using the configuration information and performs synchronization with the new SN 2*b*-4 by using given RACH information. When the synchronization is successful, the UE 2*b*-1 transmits an RRC reconfiguration complete message to the MN 2*b*-3 (2*b*-11) and resumes a DRB (2*b*-10) to start transmission data to or reception of data from the new SN 2*b*-4.

Figure 12:
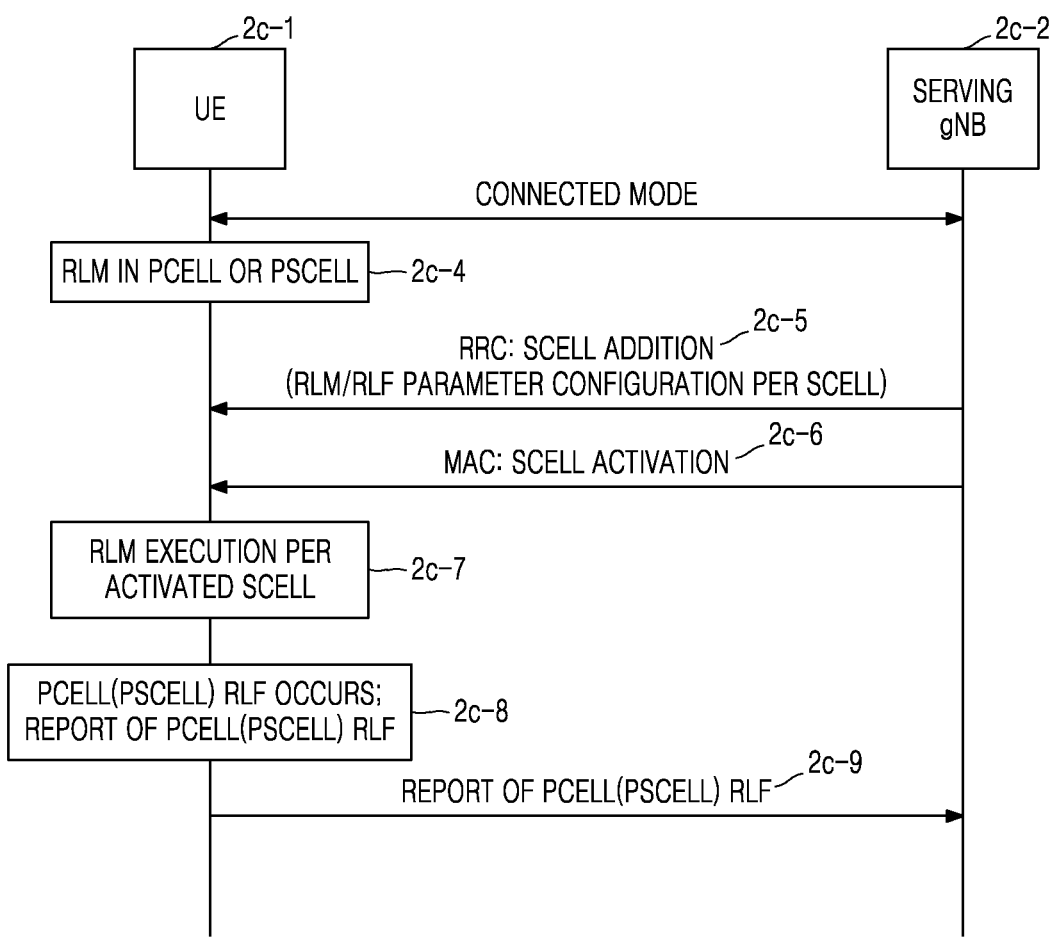
FIG. 12 is a diagram illustrating a PCell and handling an RLF in the Pscell by using a Scell, according to an embodiment of the disclosure.

FIG. 12 is a diagram illustrating a Pcell and handling an RLF in the Pscell by using a Scell, according to an embodiment of the disclosure.

In an embodiment of the disclosure, a UE which is in a connected mode may perform a RLM/RLF operation not only in a sPcell but also in a Scell. When an RLF occurs in the sPcell, the occurrence of the RLF in the sPcell is reported to a serving gNB at the occurrence of the RLF by Scells that are activated and are not in a failure state among Scells for which a Physical Uplink Control Channel (PUCCH) and a Physical Uplink Shared Channel (PUSCH) are set. Here, the failure state may be an RLM failure, a RACH failure, an RRC configuration failure, a security failure, or a failure due to an RLF maximum retransmission in the Scell. Here, the RLM failure refers to a case in which an RLF timer expires when a predetermined number of consecutive OOS indications are generated and transmitted to a Radio Resource Control (RRC) layer and thereafter a predetermined number of consecutive IS indications are not generated and transmitted to the RRC layer when the RLF timer is operated by RRC, while a UE receives a reference signal (RS) for RLM and threshold information for generation of an In-Sync (IS) signal or an Out-Of-Sync (OOS) signal and performs RLM at a physical layer. The RLM failure will be hereinafter defined as described above. In an embodiment of the disclosure, a report about the occurrence of an RLF in a sPcell may include the ID of the sPcell in which the RLF has occurred, an indication of a cell group to which the sPcell belongs, and a cause value of the RLF. Here, the cause value of the RLF may be an RLM failure, a RACH failure, an RRC configuration failure, a security failure, RLF max retransmission, or the like.

FIG. 12 illustrates an operation of reporting the handling of an RLF in a Pcell or a Pscell through a Scell. A UE 2*c*-1 maintains a connected mode with a serving gNB 2*c*-2. At the same time, an RLM/RLF operation is performed in a Pcell or Pscell (2*c*-4). The serving gNB 2*c*-2 may add a Scell through an RRC message in the connected mode (2*c*-5). In this case, with respect to the added Scell, parameters for performing the RLM/RLF operation and identifying an RLF may be configured and transmitted for each Scell. In this case, a parameter to be considered may be indicated using a time and frequency position of a reference signal for RLM/RLF and an ID of a predefined reference signal or using an ID of a predefined reference signal configuration (RS set), and may be a Transceiver Control Interface state (TCI-state) of a predefined Physical Downlink Control CHannel (PDCCH) when there is no additional reference signal configuration. In addition, the number of consecutive predefined In-Sync (IS) or OOS indications to start an RLF timer, a value of the RLF timer, or the like may be transmitted, based on a reception signal-based threshold information for determining whether each RLM/RLF operation is successful or fails and a threshold of each reception signal. Alternatively, a pair of indexes for IS or OOS of a threshold, which is used to determine IS or OOS according to the type of a service, may be considered as parameters. These values may be defined for each Scell.

Thereafter, the serving gNB 2*c*-2 may activate a certain Scell among added Scells with a MAC Control Element (CE) (2*c*-6). The UE 2*c*-1 performs the RLM/RLF operation by using an RLM/RLF parameter of the activated Scell (2*c*-7). As the RLM/RLF operation, the following operations may be performed for each cell. A physical layer of the UE 2*c*-1 measures the strength of a reception signal of an RLM/RLF reference signal given for each Scell, based on a given RLM/RLF parameter, generates an IS when the measured strength is greater than a threshold of the IS or generates an OOS when the measured strength is less than a threshold of the OOS, and informs an RRC layer of the UE 2c-1 of the generated IS or OOS. When the number of continuously informed indications is greater than a predetermined number of consecutive ISs or OOSs, the RLF timer is started (when the number of continuously informed indications is greater than the predetermined number of OOSs) or the RLF timer already operated is stopped (when the number of continuously informed indications is greater than the predetermined number of ISs). In this case, an IS/OOS indication for each cell is required. When the RLF timer expires, a corresponding cell or Scell is declared as an RLF. Furthermore, for each Scell, when an RLC maximum retransmission number is reached or a RACH failure occurs, an RLF occurs in a corresponding Scell. When an RLF occurs in a Pcell or Pscell, the UE 2b-1 notifies the serving gNB 2c-2 of the RLF in the Pcell or Pscell by using an uplink (UL) of a Scell in which an RLF does not occur, in consideration of Scells for which an UL is set among currently activated Scells (2c-9). A configuration of such an UL refers to a case in which a PUCCH or PUSCH is configured. Even if there is no additional downlink cell, when there is an additional UL such as a supplementary UL (SUL), a report may be delivered through the additional UL. Information included in this report may be the ID of a cell in which an RLF has occurred, a cause value of the RLF (RLF timer expiry, an RLC max retransmission reach, a RACH failure, a handover failure or the like), and the ID of a cell group to the Pcell or Spcell in which the RLF has occurred belongs. This report may be an RRC message or may be transmitted through an MAC CE. When this report is transmitted in an RRC message, a signaling radio bearer (SRB) may be used. In this case, the serving gNB 2c-2 may correspond to a master mode or all secondary nodes.

In relation to the RLM/RLF operation for each cell described above, when a linear value of reception signal strength is given as a threshold to identify an RLF, an OOS is generated when reception signal strength obtained by measuring an RLM-RS is not greater than a threshold for an OOS and an IS is generated when the reception signal strength obtained by measuring the RLM-RS is greater than a threshold for an IS as described above. When a target error rate that is one-to-one converted into reception signal strength is considered as a threshold for identifying an RLF, reception signal strength of an RLM-RS corresponding to each target error rate value may be considered as a threshold, and an IS is generated when reception signal strength obtained by measuring an RLM-RS is greater than a threshold for reception signal strength converted for an IS and an OOS is generated when the reception signal strength obtained by measuring the RLM-RS is not greater than a threshold of reception signal strength converted for an OOS, as described above.

In addition, the UE 2c-1 transmits an IS/OOS for each cell from a physical layer to an upper layer in relation to an RLM/RLF operation for each cell. In this case, an RLF timer for each cell may be operated at the upper layer. At the upper layer, the RLF timer may be operated independently, and in order to transmit a report on a cell in which an RLF has occurred later, the UE 2c-1 may set a best Scell in advance among Scells, for which an effective uplink that is not in an RLF state is set, by selecting certain priority and may inform the serving gNB 2c-2 of the best Scell. In this case, the best Scell may be informed through an RRC message or a MAC CE. In a method of setting the certain priority, a cell in which an RLF timer is not currently started may have priority over a cell in which the RLF timer has already been started. When the RLF timer is started in all cells, it may be determined that no cell is in a failure state or priority may be given to a cell in which the RLF timer was started most recently among cells in which the RLF timer was started.

Figure 13:
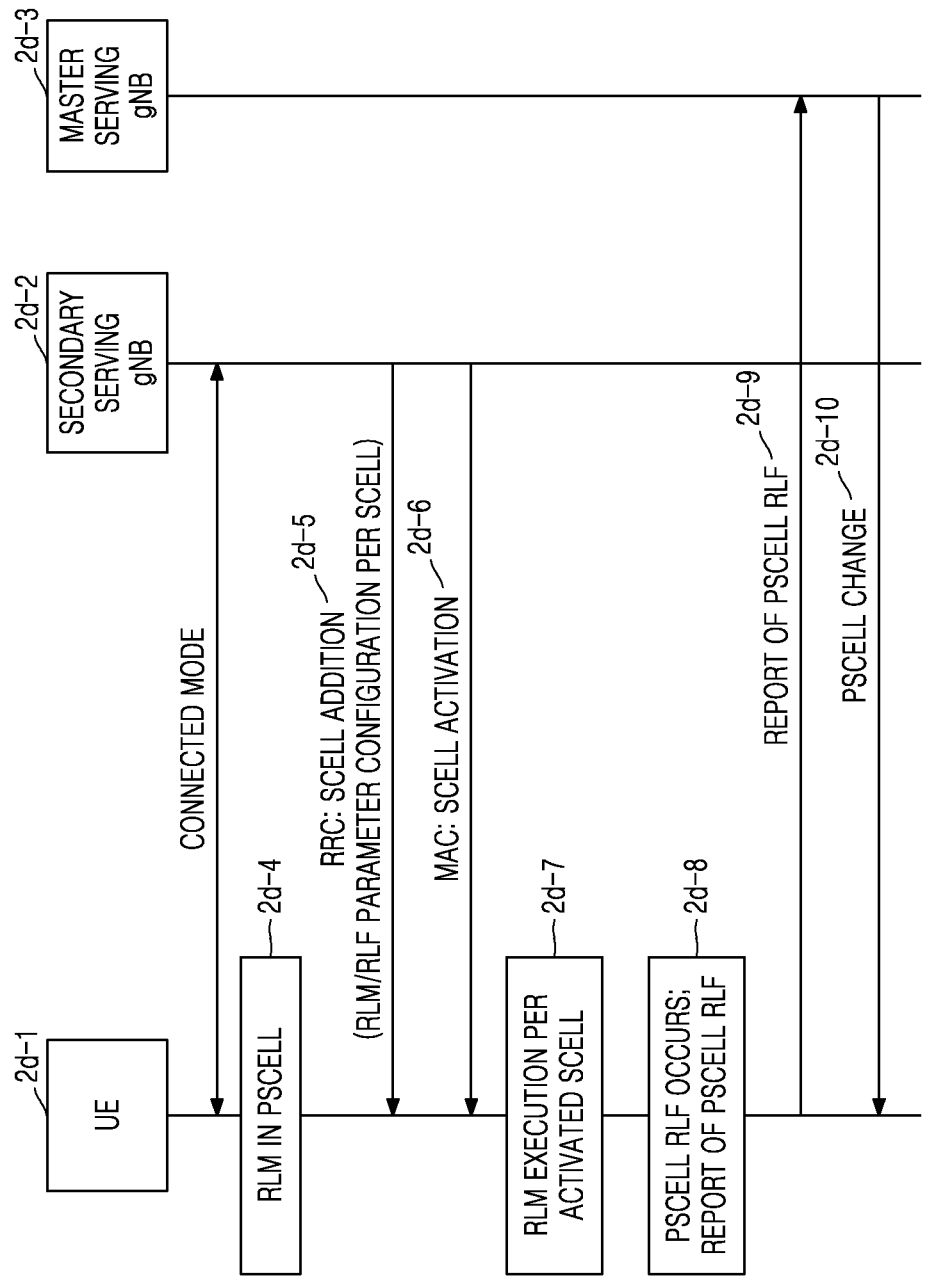
FIG. 13 is a diagram illustrating reporting an RLF in a Pscell through a Scell and performing handover using a main node (MN), according to an embodiment of the disclosure.

FIG. 13 is a diagram illustrating reporting an RLF in a Pscell through a Scell and performing handover using a Main Node (MN), according to an embodiment of the disclosure.

An operation of reporting the handling of the RLF in the Pscell to the MN through a Scell and transmitting a Pscell change message from the MN to a UE will be described with reference to FIG. 13. A UE 2d-1 maintains a connected mode with an SN serving gNB 2d-2 and an MN serving gNB 2d-3. At the same time, the UE 2d-1 performs a RLM/RLF operation in a Pscell (2d-4). In a connected mode, the SN serving gNB 2d-2 may add a Scell through an RRC message (2d-5). In this case, with respect to the added Scell, parameters for performing the RLM/RLF operation and identifying an RLF may be configured and transmitted for each Scell. In this case, a parameter to be considered may be indicated with a time and frequency position of a reference signal for RLM/RLF and either an ID of a predefined reference signal or an ID of a predefined reference signal configuration (RS set), and may be a TCI-state of a predefined PDCCH when there is no additional reference signal configuration. In addition, the number of consecutive predefined IS or OOS indications to start an RLF timer, a value of the RLF timer, or the like may be transmitted, based on a reception signal-based threshold information for determining whether each RLM/RLF operation is successful or fails and a threshold of each reception signal. Alternatively, a pair of indexes for IS or OOS of a threshold, which is used to determine IS or OOS according to the type of a service, may be considered as parameters. These values may be defined for each Scell.

Thereafter, the SN serving gNB 2d-2 may activate a certain Scell among added Scells with a MAC CD (2d-6). The UE 2d-1 performs an RLM/RLF operation using an RLM/RLF parameter of the activated Scell (2d-7). As the RLM/RLF operation, the following operations may be performed for each cell. A physical layer of the UE 2d-1 measures the strength of a reception signal of an RLM/RLF reference signal given for each Scell, based on a given RLM/RLF parameter, generates an IS when the measured strength is greater than a threshold of the IS or generates an OOS when the measured strength is less than a threshold of the OOS, and informs an RRC layer of the UE 2d-1 of the generated IS or OOS. When the number of continuously informed indications is greater than the number of consecutive predefined ISs or OOSs, the RLF timer is started (when the number of continuously informed indications is greater than the number of OOSs) or the RLF timer already operated is stopped (when the number of continuously informed indications is greater than the number of ISs). In this case, an IS/OOS indication for each cell is required. When the RLF timer expires, a corresponding cell or Scell is declared an RLF. Furthermore, for each Scell, even when an RLC maximum retransmission number is reached or a RACH failure occurs, an RLF occurs in a corresponding Scell. When an RLF occurs in a Pcell or Pscell, the UE 2d-1 notifies the SN serving gNB 2d-2 of the RLF in the Pcell or Pscell by using an uplink (UL) of a Scell in which an RLF does not occur, in consideration of Scells for which an UL is set among currently activated Scells (2d-9). A configuration of such an UL refers to a case in which a PUCCH or PUSCH is configured. Even if there is no additional downlink cell, when there is an additional UL such as a supplementary UL (SUL), a report may be delivered through the additional UL. This report may be an RRC message or may be transmitted through an MAC CE. When this report is transmitted in an RRC message to the MN serving gNB 2*d*-3, the MN serving gNB 2*d*-3 may issue a Pscell change or handover command through an SRB1 (2*d*-10).

Figure 14:
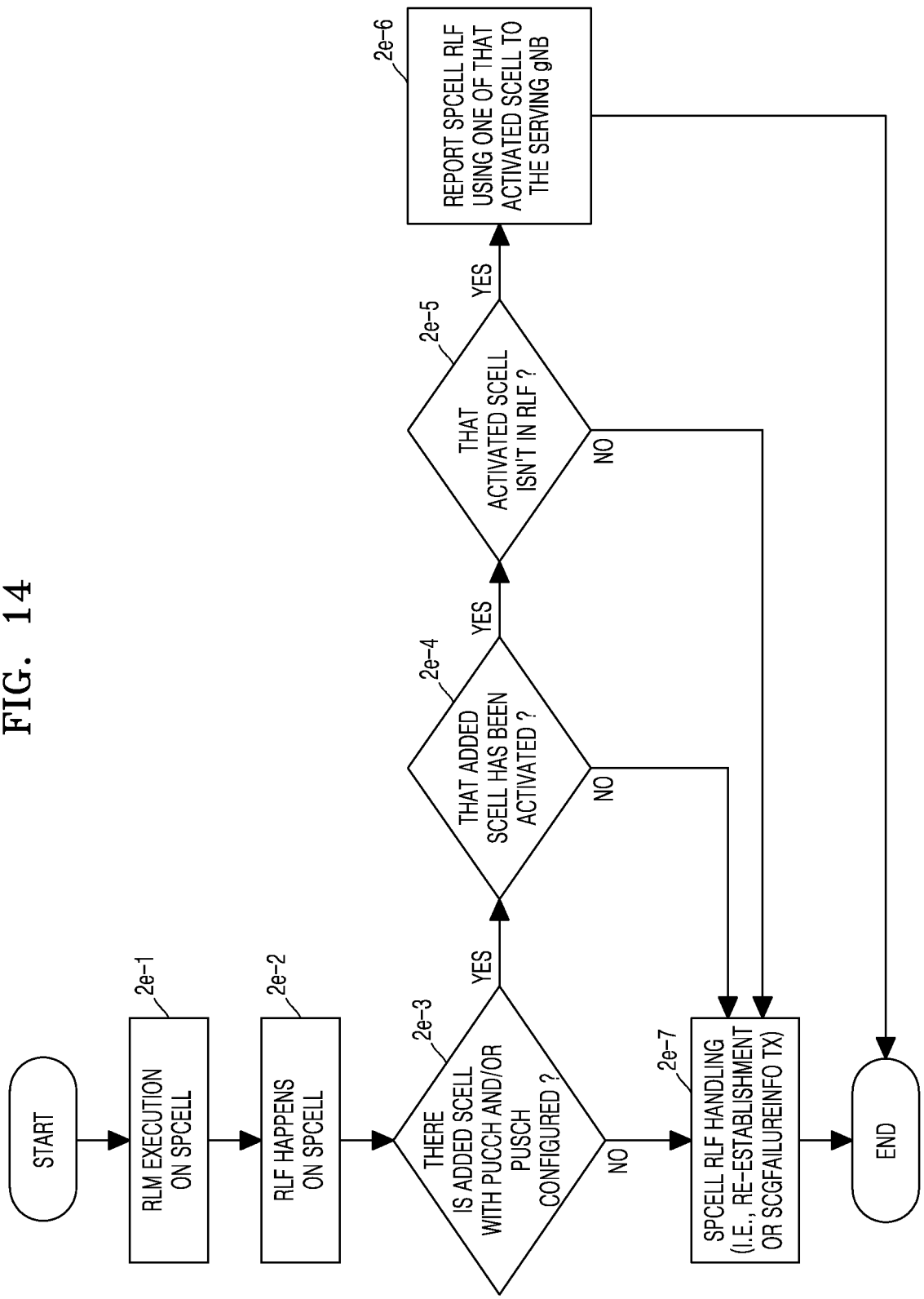
FIG. 14 is a diagram illustrating reporting an RLF in a sPcell by a user equipment through a Scell, according to an embodiment of the disclosure.

FIG. 14 is a diagram illustrating reporting an RLF in a sPcell by a UE through a Scell, according to an embodiment of the disclosure.

Referring to FIG. 14, the UE always performs RLM/RLF with respect to a sPcell in a connected state (2*e*-1). A physical layer measures the strength of a reception signal of an RLM/RLF reference signal given for each Scell, based on a given RLM/RLF parameter, generates an IS when the measured strength is greater than a threshold of the IS or generates an OOS when the measured strength is less than a threshold of the OOS, and informs an RRC layer of the UE of the generated IS or OOS. When the number of continuously informed indications is greater than the number of consecutive predefined ISs or OOSs, an RLF timer is started (when the number of continuously informed indications is greater than the number of OOSs) or the RLF timer already operated is stopped (when the number of continuously informed indications is greater than the number of ISs). In this case, an IS/OOS indication for each cell is required. When the RLF timer expires, a corresponding cell or Scell is declared as an RLF. Furthermore, for each Scell, even when an RLC maximum retransmission number is reached or a RACH failure occurs, an RLF occurs in a corresponding Scell. When an RLF occurs in a sPcell, first, it is checked whether a Scell in which an uplink (a PUCCH and/or a PUSCH) is configured is added to a corresponding serving gNB (2*e*-3). When there is such a Scell, it is checked whether the Scell is activated (2*e*-4). When the Scell is activated, it is checked whether the Scell is in an RLF state (2*e*-5). When the Scell is not in the RLF state, an RLF in the sPcell is reported through one of the other Scells (2*e*-6). When any one of operations 2*e*-3, 2*e*-4, 2*e*-5, and 2*e*-6 is not satisfied, the UE handles the RLF in the sPcell to perform RRC connection re-establishment or transmit SCGFailureInformationPerform (2*e*-7).

In an embodiment of the disclosure, not only an RLF in the sPcell but also an RLF in any activated Scell among added Scells may be reported to a serving gNB by another cell which is not in an RLF state and in which an uplink is configured. Referring to FIG. 12, in operation 2*c*-8, when an RLF occurs in any activated Scell in which an uplink is configured, as well as in a sPcell, the RLF may be reported to a serving gNB through a cell which is not in the RLF state and in which an uplink is configured among the other cells except the Scell. In operation 2*c*-9, not only the RLF in the sPcell but also an RLF in any activated Scell in which RLM/RLF is performed may be reported through this cell. Operations other than operations 2*c*-8 and 2*c*-9 are the same as those described above with reference to FIG. 12, and operations in FIG. 13 other than operations 2*d*-8 and 2*d*-9 are also the same as those described above with reference to FIG. 12.

Re-establishment condition: a UE does not perform a re-establishment operation when all available cells or uplinks are not in a failure state. When all available cells or all uplinks are in a failure state, the UE may perform RRC connection re-establishment in case of an MCG and transmit SCG failure information to the MCG in the case of an SGC.

In an embodiment of the disclosure, as in operation 2*c*-9 or 2*d*-9 according to the above-described embodiment of the disclosure, when the UE transmits an RLF report to a Scell or a cell which is not in an RLF state and in which an uplink is configured, the UE may change a configuration to allow an activated Scell to receive a downlink data DLdata and a control channel, when reception of the downlink data DLdata and the control channel is set to cross-carrier scheduling or sPcell only. The UE may transmit a scheduling report (SR) and a buffer state report (BSR) at a later time to receive a UL grant from a serving gNB through a corresponding downlink monitoring cell. If the gNB station receives a Scell (or sPcell) RLF report, when a CA scheduling method of the UE that transmits this report is set to cross-carrier scheduling, the cross-carrier scheduling may be changed to activated Scell scheduling. In addition, downlink (DL) and uplink (UL) scheduling using a failed cell ID indicated in a failure report is stopped, and data and control channels are scheduled in another cell (Scell or sPcell) that is not in an RLF situation. In this case, the serving gNB may transmit a command, in an RRC message, to change sPcells or to perform handover to the UE.

In relation to an RLM/RLF operation in a Scell, there may be various examples of a timing of the RLM/RLF operation. In the case of a Pcell, the RLM/RLF operation may be performed as soon as an RLM-RS and RLF parameters are set. When a Scell is initially added, the Scell may be added in a deactivated state. The Scell is added through RRC, and a physical layer thereof is configured but it is not to be used immediately and thus is added in an inactivated state. In this regard, there may be various timings of performing the RLM/RLF operation.

Figure 15:
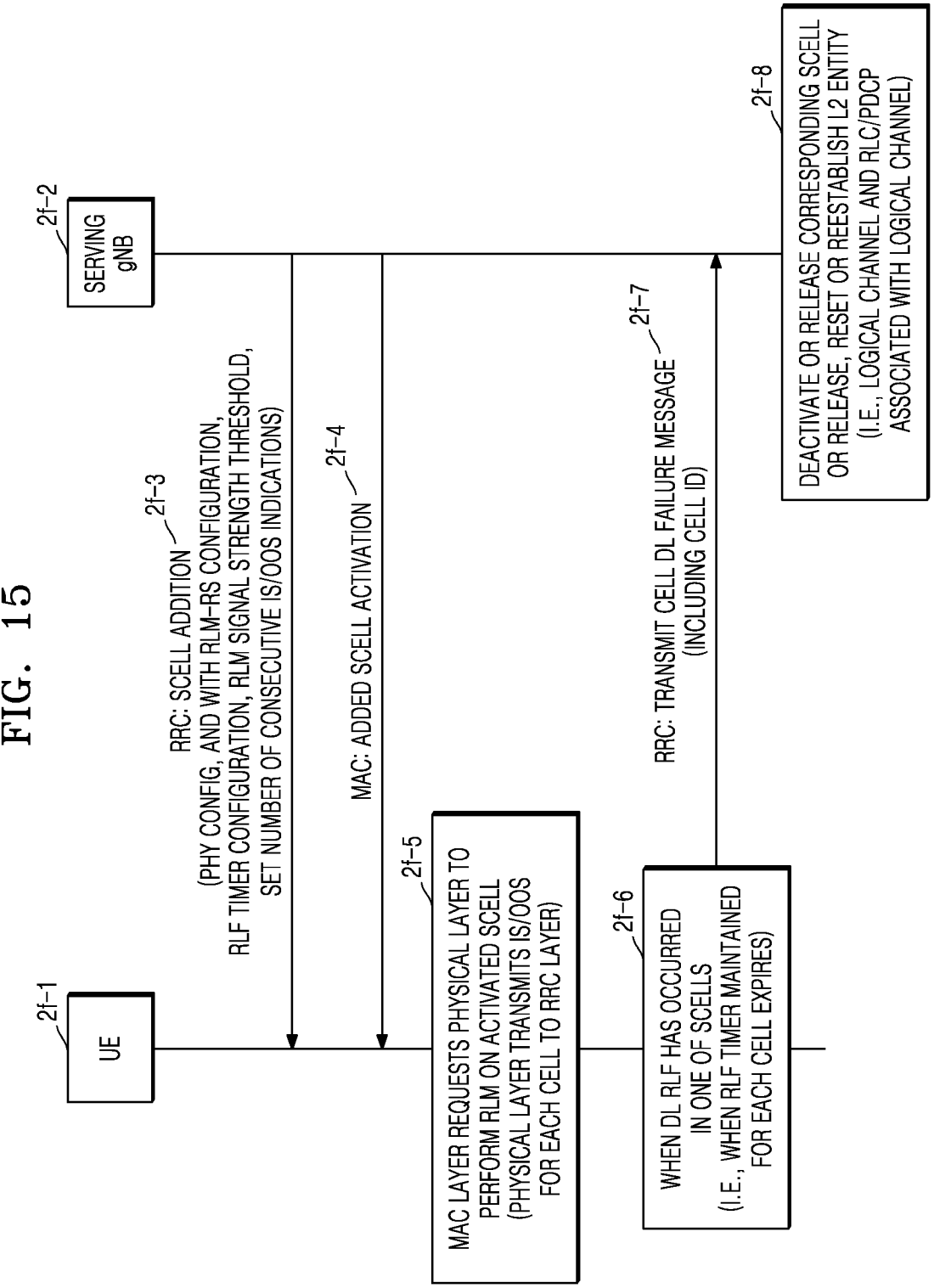
FIG. 15 is a diagram illustrating a radio link monitoring (RLM)/RLF operation during cell activation when an RLF in a Scell is reported, according to an embodiment of the disclosure.

FIG. 15 is a diagram illustrating an RLM/RLF operation during cell activation when an RLF in a Scell is reported, according to an embodiment of the disclosure.

Referring to FIG. 15, a UE 2*f*-1 is configured with addition of a Scell, based on an RRC message from a serving gNB 2*f*-2. The configuration information may include a physical (PHY) layer configuration, an RLM-RS configuration, an RLF timer configuration, a threshold, which is a criterion for determination of signal strength of an RLM/RLF signal, the number of consecutive IS/OOS indications, etc. (2*f*-3). Thereafter, the UE 2*f*-1 is informed of the activation of the added Scell through an MAC CE (2*f*-4). Therefore, an MAC layer of the UE 2*f*-1 requests the PHY layer to perform the RLM/RLF operation in the activated Scell, and the PHY layer transmits an IS/OOS for each cell to an RRC layer (2*f*-5). That is, the RLM/RLF operation described above is performed. When an RLF has occurred in one of Scells (2*f*-6), the UE 2*f*-1 reports information about the Scell, in which the RLF has occurred, and an RLF cause value to the serving gNB 2*f*-2 through an RRC message or MAC CE (2*f*-7). The serving gNB 2*f*-2 may check this report, and deactivate or release the Scell or release, reset or reestablish an L2 entity (i.e., a logical channel and an RLC/PDCP associated with the logical channel) associated with the Scell (2*f*-8).

Figure 16:
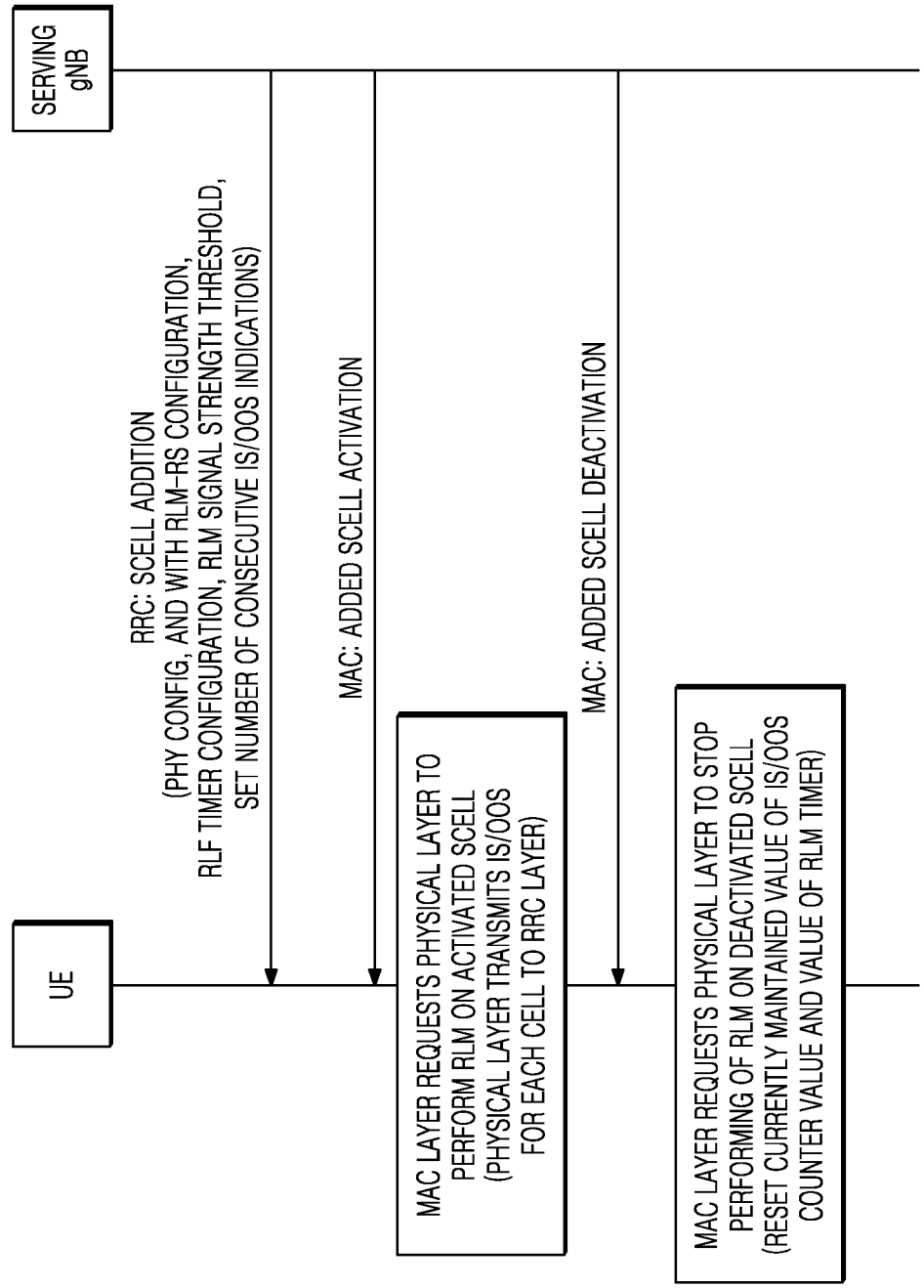
FIG. 16 is a diagram illustrating a process of stopping an RLM/RLF operation during cell deactivation when an RLF in a Scell is reported, according to an embodiment of the disclosure.

FIG. 16 is a diagram illustrating a process of stopping an RLM/RLF operation during cell deactivation when an RLF in a Scell is reported, according to an embodiment of the disclosure.

Referring to FIG. 16, a UE may receive configuration information for adding and activating a Scell from a serving gNB, and perform an RLM/RLF operation for the corresponding Scell, as illustrated in FIG. 15. Thereafter, when the serving gNB indicates to deactivate the added Scell through an MAC CE, an MAC layer of the UE may request a PHY layer to stop RLM/RLF operation for the deactivated Scell and may reset or suspend current values of an OOS counter and an RLF timer, when necessary.

Figure 17:
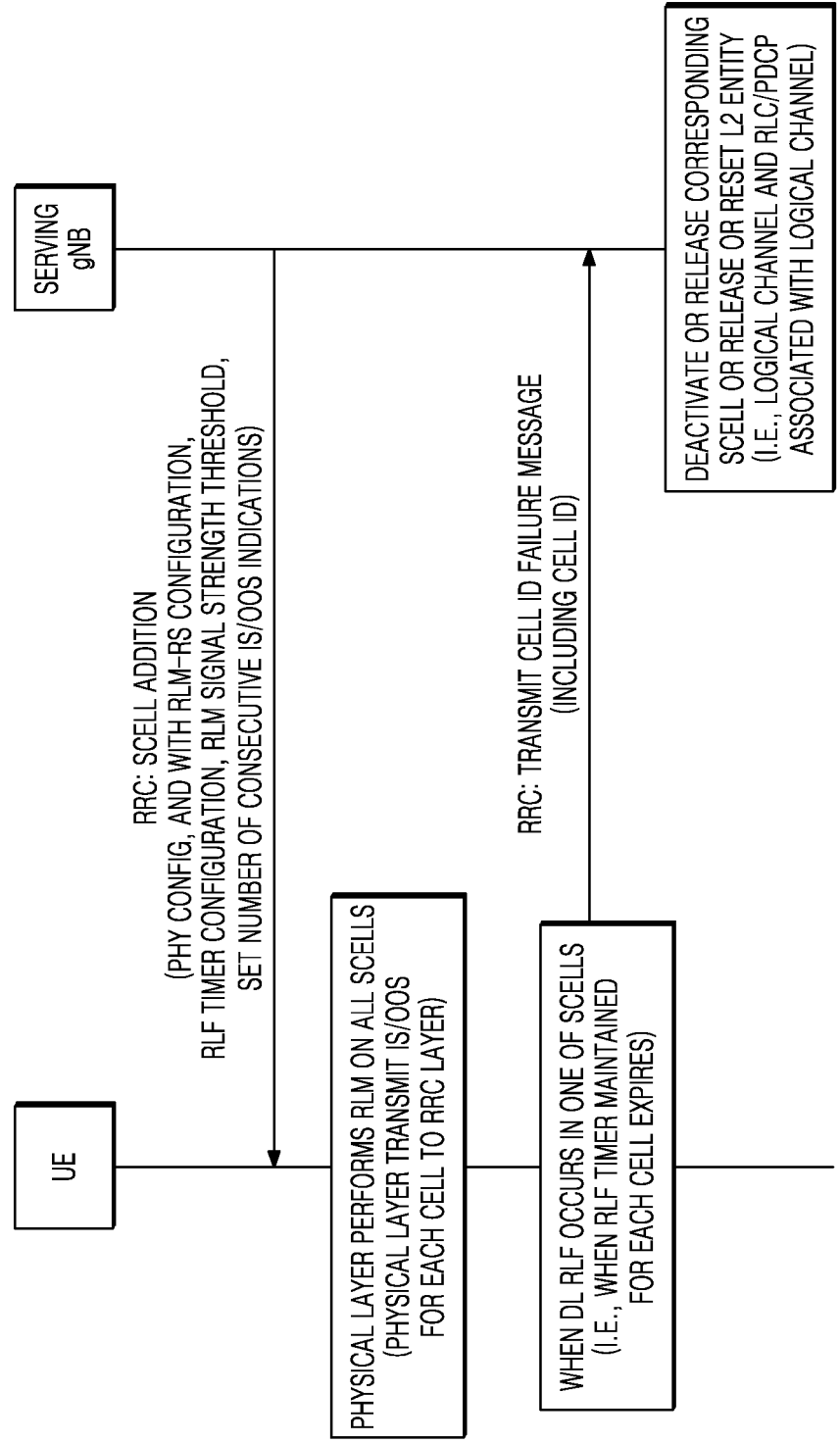
FIG. 17 is a diagram illustrating an RLM/RLF operation when a Scell is added, according to an embodiment of the disclosure.

FIG. 17 is a diagram illustrating an RLM/RLF operation when a Scell is added, according to an embodiment of the disclosure.

Referring to FIG. 17, when a Scell is added, a UE may receive configuration information, including a physical layer configuration, an RLM-RS configuration, an RLF timer configuration, a threshold, which is a criterion for determination of signal strength of an RLM/RLF signal, the number of consecutive IS/OOS indications, and the like, from a serving gNB. Upon receiving these values, the UE performs RLM/RLF in the added Scell. When an RLF timer maintained for each cell expires during the performing of the RLM/RLF, the UE may transmit the ID of a corresponding RLF cell in an RRC message to the serving gNB, and the serving gNB may check this report and deactivate or release of the Scell or release, reset or reestablish an L2 entity associated with the Scell (i.e., an RLC/PDCP associated with a logical channel) (2f-8). In this case, when the RLM-RS or an RLF parameter is changed, the RLF timer which is operating and an accumulative number of counted IS/OOS indications may be reset.

Figure 18:
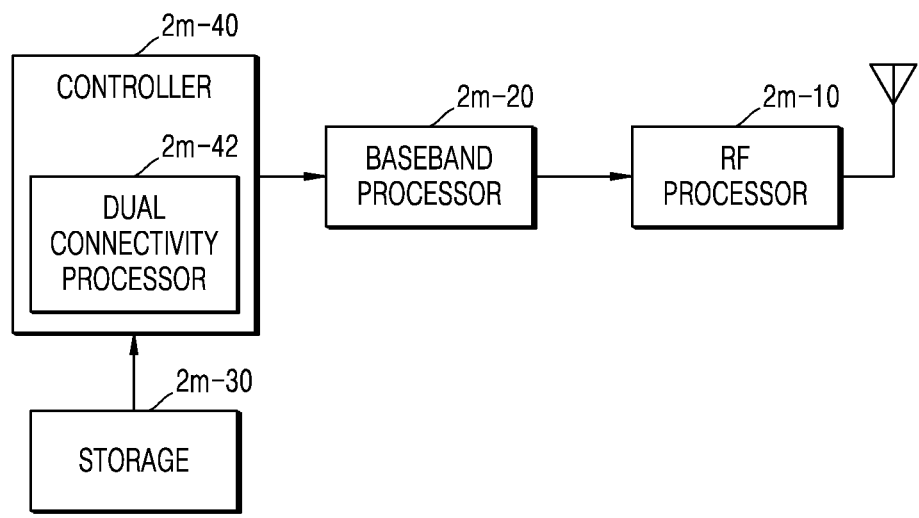
FIG. 18 is a block diagram illustrating a configuration of a user equipment according to another embodiment of the disclosure.

FIG. 18 is a block diagram illustrating a configuration of a UE according to another embodiment of the disclosure.

Referring to FIG. 18, the UE includes a RF processor $2m$-10, a baseband processor $2m$-20, a storage $2m$-30, and a controller $2m$-40.

The RF processor $2m$-10 performs functions, such as signal-band conversion and amplification, to transmit and receive signals through a wireless channel. That is, the RF processor $2m$-10 up-converts a baseband signal provided from the baseband processor $2k$-20 into an RF band signal and transmits the RF band signal via an antenna, and down-converts an RF band signal received via the antenna into a baseband signal. For example, the RF processor $2m$-10 may include a transmission filter, a reception filter, an amplifier, a mixer, an oscillator, a digital-to-analog convertor (DAC), an analog-to-digital convertor (ADC), and the like. Although only one antenna is shown in FIG. 18, the UE may include a plurality of antennas. The RF processor $2m$-10 may include a plurality of RF chains. Furthermore, the RF processor $2m$-10 may perform beamforming. For beamforming, the RF processor $2m$-10 may adjust a phase and magnitude of each of signals transmitted and received through the plurality of antennas or antenna elements. In addition, the RF processor $2m$-10 may perform MIMO and receive multiple layers when MIMO is performed.

The baseband processor $2m$-20 performs conversion between a baseband signal and a bits string according to a physical layer standard of the system. For example, for data transmission, the baseband processor $2m$-20 generates complex symbols by encoding and modulating a transmission bit string. For data reception, the baseband processor $2m$-20 reconstructs a received bit string through demodulation and decoding of a baseband signal provided from the RF processor $2l$-10. For example, when an orthogonal frequency division multiplexing (OFDM) scheme is used, for data transmission, the baseband processor $2m$-20 generates complex symbols by encoding and modulating a transmission bit string, maps the complex symbols to subcarriers, and constructs OFDM symbols through inverse fast Fourier transform (IFFT) and cyclic prefix (CP) insertion. In addition, for data reception, the baseband processor $2m$-20 divides a baseband signal from the RF processor $2m$-10 into OFDM symbols, reconstructs signals mapped to subcarriers through fast Fourier transform (FFT), and reconstructs a received bit string by demodulation and decoding.

The baseband processor $2m$-20 and the RF processor $2m$-10 transmit and receive signals as described above. Accordingly, the baseband processor $2m$-20 and the RF processor $2m$-10 may be each referred to as a transmitter, a receiver, a transceiver, or a communicator. Furthermore, at least one of the baseband processor $2m$-20 or the RF processor $2m$-10 may include a plurality of communication modules to support different radio access technologies. In addition, at least one of the baseband processor $2m$-20 or the RF processor $2m$-10 may include different communication modules to process signals of different frequency bands. For example, different radio access technologies may include a wireless LAN (e.g., IEEE 802.11), a cellular network (e.g., LTE), and the like. In addition, different frequency bands may include a super-high-frequency (SHF) band (e.g., 2.NRHz or NRhz) and a millimeter wave band (e.g., 60 GHz).

The storage $2m$-30 stores data such as a basic program, an application program, and configuration information for operation of the UE. In addition, the storage $2m$-30 provides the stored data in response to a request from the controller $2m$-40.

The controller $2m$-40 controls overall operations of the UE. For example, the controller $2m$-40 transmits and receives signals through the baseband processor $2m$-20 and the RF processor $2m$-10. Furthermore, the controller $2m$-40 writes data to and reads data from the storage $2k$-30. To this end, the controller $2m$-40 may include at least one processor. For example, the controller $2m$-40 may include a communication processor (CP) for control of communication and an application processor (AP) for control of an upper layer such as an application program.

Figure 19:
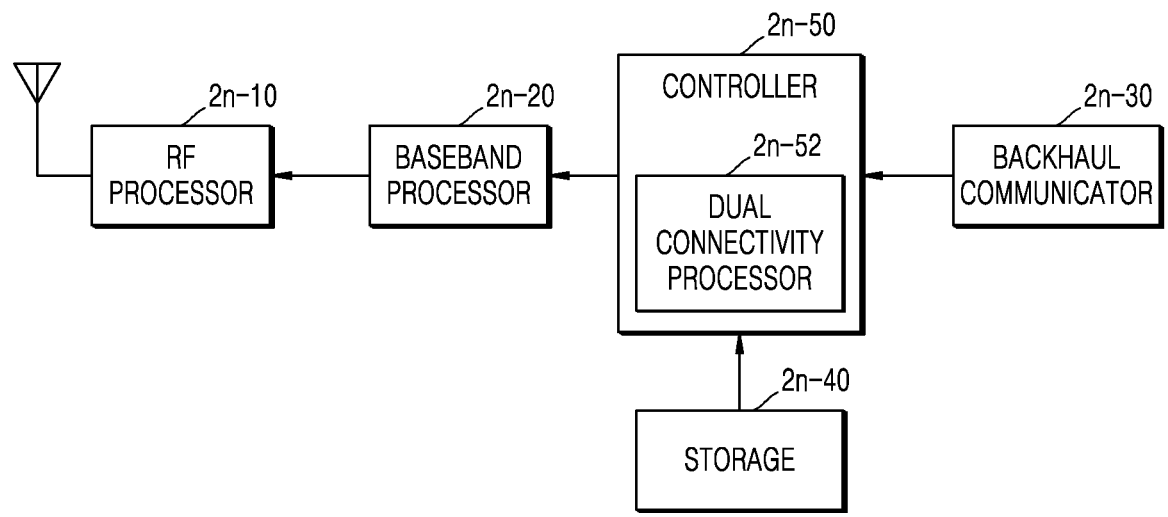
FIG. 19 is a block diagram illustrating a configuration of a base station according to another embodiment of the disclosure.

FIG. 19 is a block diagram illustrating a configuration of a base station according to another embodiment of the disclosure.

As illustrated in FIG. 19, the base station includes an RF processor $2n$-10, a baseband processor $2n$-20, a backhaul communicator $2n$-30, a storage $2n$-40, and a controller $2n$-50.

The RF processor $2n$-10 performs functions, such as signal-band conversion and amplification, to transmit and receive signals through a wireless channel. That is, the RF processor $2n$-10 up-converts a baseband signal provided from the baseband processor $2n$-20 into an RF band signal and transmits the RF band signal via an antenna, and down-converts an RF band signal received via the antenna into a baseband signal. For example, the RF processor $2n$-10 may include a transmission filter, a reception filter, an amplifier, a mixer, an oscillator, a DAC, an ADC, and the like. Although only one antenna is illustrated in FIG. 19, embodiments of the disclosure are not limited thereto and a plurality of antennas may be provided. The RF processor $2n$-10 may include a plurality of RF chains. Furthermore, the RF processor $2n$-10 may perform beamforming. For beamforming, the RF processor $2n$-10 may adjust a phase and magnitude of each of signals transmitted and received through the plurality of antennas or antenna elements. The RF processor $2n$-10 may transmit one or more layers to perform a downlink MIMO operation.

The baseband processor $2n$-20 performs conversion between a baseband signal and a bits string according to a physical layer standard. For example, for data transmission, the baseband processor $2n$-20 generates complex symbols by encoding and modulating a transmission bit string. For data reception, the baseband processor $2n$-20 reconstructs a received bit string through demodulation and decoding of a baseband signal provided from the RF processor 2n-10. For example, when the OFDM scheme is used, for data transmission, the baseband processor 2n-20 generates complex symbols by encoding and modulating a transmission bit string, maps the complex symbols to subcarriers, and then constructs OFDM symbols through IFFT and CP insertion. In addition, for data reception, the baseband processor 2n-20 divides a baseband signal from the RF processor 2n-10 into OFDM symbols, reconstructs signals mapped to subcarriers through FFT, and reconstructs a received bit string by demodulation and decoding. The baseband processor 2n-20 and the RF processor 2n-10 transmit and receive signals as described above. Accordingly, the baseband processor 2n-20 and the RF processor 2n-10 may be each referred to as a transmitter, a receiver, a transceiver, a communicator, or a wireless communicator.

The backhaul communicator 2n-30 provides an interface for communication with other nodes in a network. That is, the backhaul communicator 2n-30 converts a bit string transmitted from a main gNB to another node, e.g., an auxiliary gNB or a core network, into a physical signal, and converts a physical signal received from another node into a bit string.

The storage 2n-40 stores data such as a basic program, an application program, and configuration information for operation of the main gNB. In particular, the storage 2n-40 may store information about a bearer allocated to a connected UE, measurement results reported from the connected UE, and the like. The storage 2n-40 may further store information serving as a criterion for determining whether to provide multi-connection to the UE or stop the multi-connection. In addition, the storage 2n-40 provides the stored data in response to a request from the controller 2l-50.

The controller 2n-50 controls overall operations of the main gNB. For example, the controller 2l-50 transmits and receives signals through the baseband processor 2l-20 and the RF processor 2l-10 or through the backhaul communicator 2l-30. Furthermore, the controller 2n-50 writes data to and reads data from the storage 2l-40. To this end, the controller 2n-50 may include at least one processor.

In an embodiment of the disclosure, in a next-generation mobile communication system (5G or NR system), an RLF in a sPcell RLF may be reported through a valid Scell, so that even when a UE includes extra cells, the transmission and reception of data may be stopped and a time needed to search for a new gNB and try an RRC connection may be reduced or eliminated. Therefore, it is possible to ensure a very short data transmission/reception stop time for ultra-reliable and low-latency services of the next generation mobile communication system.

The methods according to the embodiments of the disclosure described in the claims or specification of the disclosure may be implemented by hardware, software, or a combination of hardware and software.

When the methods are implemented by software, a non-transitory computer-readable storage medium or a computer program product storing one or more programs (software modules) may be provided. The one or more programs stored in the non-transitory computer-readable storage medium of the computer program product are configured to be executable by one or more processors included in an electronic device. The one or more programs include instructions that cause an electronic device to execute the methods according to the embodiments of the disclosure set forth in the claims or specification.

Such programs (software modules or software) may be stored in a random access memory, a non-volatile memory such as flash memory, a read-only memory (ROM), an electrically erasable programmable ROM (EEPROM), a magnetic disc storage device, a compact disc-ROM (CD-ROM), a digital versatile disc (DVD), other types of optical storage devices, or a magnetic cassette. Otherwise, such programs may be stored in a memory which is a combination of some or all the above storage media. Alternatively, a plurality of such memories may be provided.

The programs may be stored in an attachable storage device accessible via communication networks such as the Internet, an Intranet, a local area network (LAN), a wide LAN (WLAN) or a storage area network (SAN) or a combination thereof. Such a storage device may be connected to a device performing embodiments of the disclosure through an external port. Otherwise, a separate storage device in a communication network may be connected to a device that performs embodiments of the disclosure.

In the embodiments of the disclosure described above, each component included in the disclosure is expressed in a singular or plural form according to a presented embodiment of the disclosure. However, singular or plural expressions are appropriately selected according to a situation described for convenience of description and the disclosure is not limited by singular or plural components. Even components expressed in a plural form may be embodied in a singular form or even components expressed in a singular form may be embodied in a plural form.

The embodiments of the disclosure set forth in the present specification and drawings are merely intended to provide examples to easily explain the technical matters of the disclosure and help understanding of the disclosure, and are not intended to limit the scope of the disclosure. That is, it will be obvious to those of ordinary skill in the art that other modified examples based on the technical spirit of the disclosure may be implemented. These embodiments of the disclosure may be implemented in combination as necessary. For example, part of an embodiment of the disclosure and part of another embodiment of the disclosure may be combined. In addition, modified examples based on the technical idea of the above-described embodiments of the disclosure may be implemented in other systems, e.g., an LTE system or a 5G or NR system.

The invention claimed is:

1. A method, performed by a user equipment (UE), of reporting a radio link failure (RLF), the method comprising:
   detecting a first Radio Link Failure (RLF) while connected to a first radio access technology (RAT) network;
   performing a connection procedure with a second RAT network;
   transmitting, to a base station of the second RAT network, a first RLF report including information on the first RLF, the information on the first RLF comprising measured result related to the first RAT network and information related to Channel State Information Reference Signal (CSI-RS); and
   transmitting, to the base station of the second RAT network, a second RLF report including information on a second RLF, wherein the second RLF detected while the UE is connected to the second RAT network.

2. The method of claim 1, further comprising:
   transmitting, to the base station of the second RAT network, information on whether the UE has the first RLF report.

3. The method of claim 2, further comprising:
receiving, from the base station of the second RAT network, information requesting a RLF report,
wherein the first RLF report is transmitted to the base station of the second RAT network in response to the information requesting a RLF report.

4. The method of claim 3, wherein the information requesting a RLF report includes requests of the RLF report for each type of RAT.

5. The method of claim 3, wherein the first RLF report, the information on whether the UE has the first RLF report, and the information requesting the RLF report is included in a radio resource control (RRC) message.

6. The method of claim 1, wherein the first RLF report and the second RLF report are included in a RLF report.

7. The method of claim 1, further comprising:
discarding the first RLF report after the transmitting of the first RLF report.

8. A user equipment (UE) comprising:
a transceiver; and
a controller configured to:
detect a first Radio Link Failure (RLF) while connected to a first radio access technology (RAT) network,
perform a connection procedure with a second RAT network,
transmit, to a base station of the second RAT network, a first RLF report including information on the first RLF, the information on the first RLF comprising measured result related to the first RAT network and information related to Channel State Information Reference Signal (CSI-RS), and
transmit, to the base station of the second RAT network, a second RLF report including information on a second RLF, wherein the second RLF detected while the UE is connected to the second RAT network.

9. The UE of claim 8, wherein the controller is further configured to:
transmit, to the base station of the second RAT network, information on whether the UE has the first RLF report.

10. The UE of claim 9, wherein the controller is further configured to:
receive, from the base station of the second RAT network, information requesting a RLF report,
wherein the first RLF report is transmitted to the base station of the second RAT network in response to the information requesting the RLF report.

11. The UE of claim 10, wherein the information requesting the RLF report includes requests of the RLF report for each type of RAT.

12. The UE of claim 10, wherein the first RLF report, the information on whether the UE has the first RLF report, and the information requesting the RLF report is included in a radio resource control (RRC) message.

13. The UE of claim 8, wherein the first RLF report and the second RLF report are included in a RLF report.

14. The UE of claim 8, wherein the controller is further configured to:
discard the first RLF report after transmission of the first RLF report.

* * * * *